Oct. 10, 1967  J. E. THORNTON ET AL  3,346,851
SIMULTANEOUS MULTIPROCESSING COMPUTER SYSTEM
Filed July 8, 1964  21 Sheets-Sheet 1

INVENTOR
JAMES E. THORNTON
SEYMOUR R. CRAY

BY Cushman, Darby & Cushman
ATTORNEYS

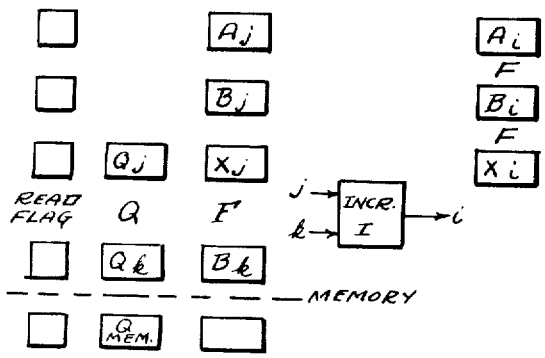
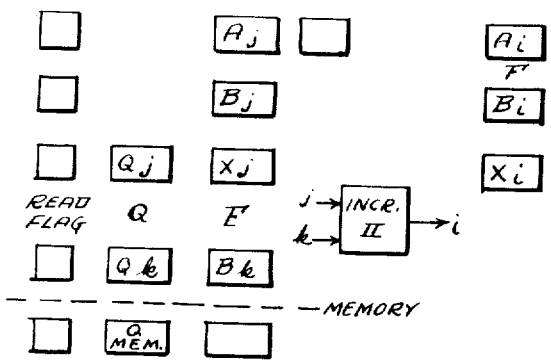
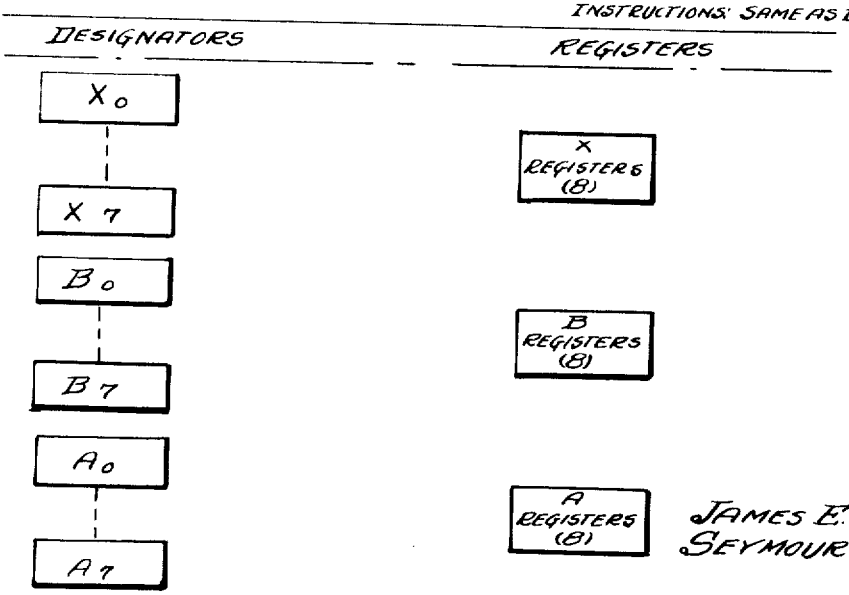
Fig. 7b
INVENTORS
JAMES E. THORNTON
SEYMOUR R. CRAY

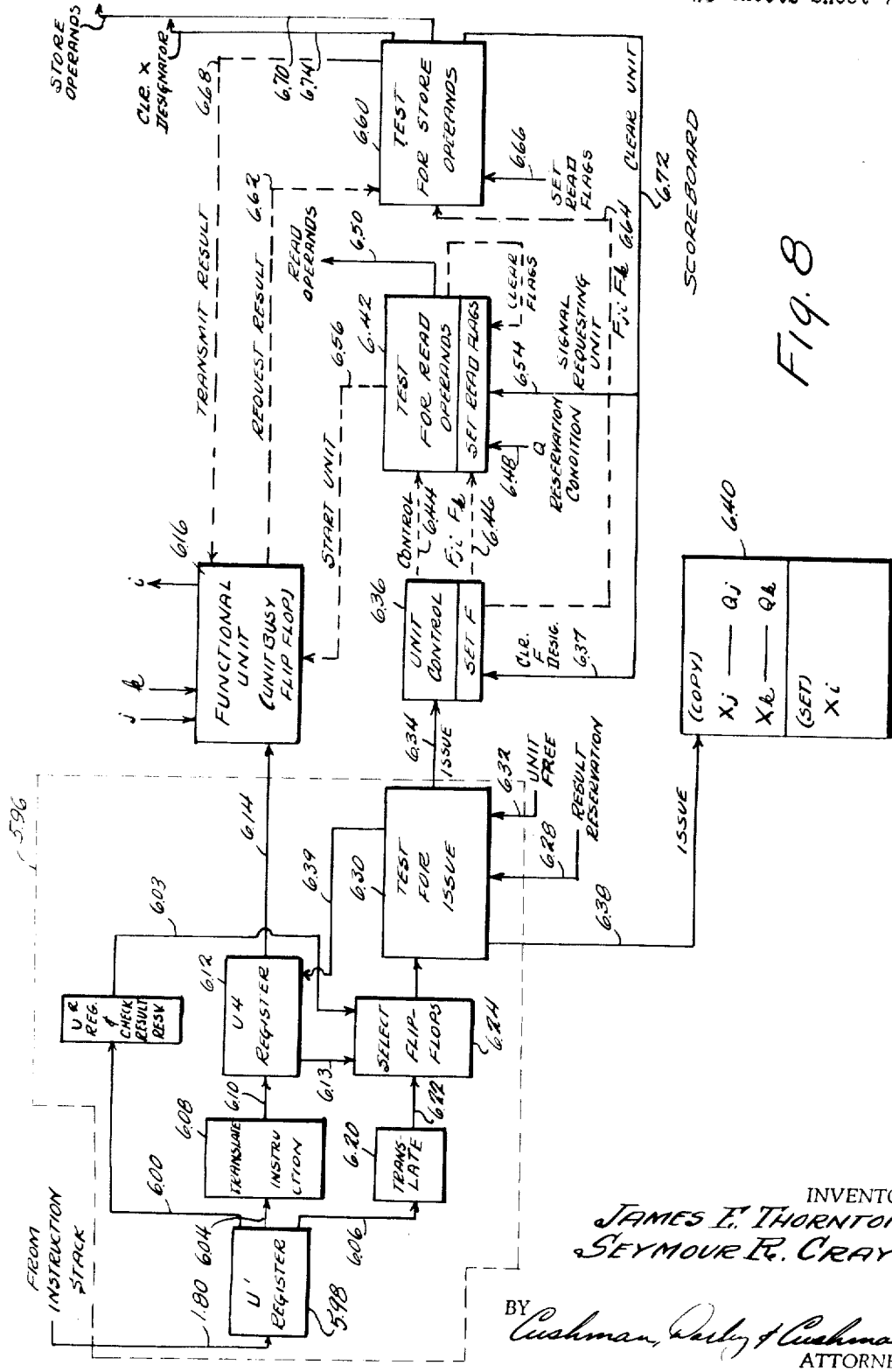

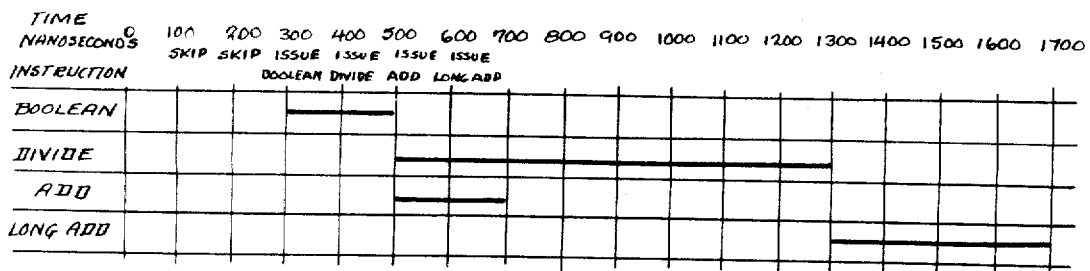

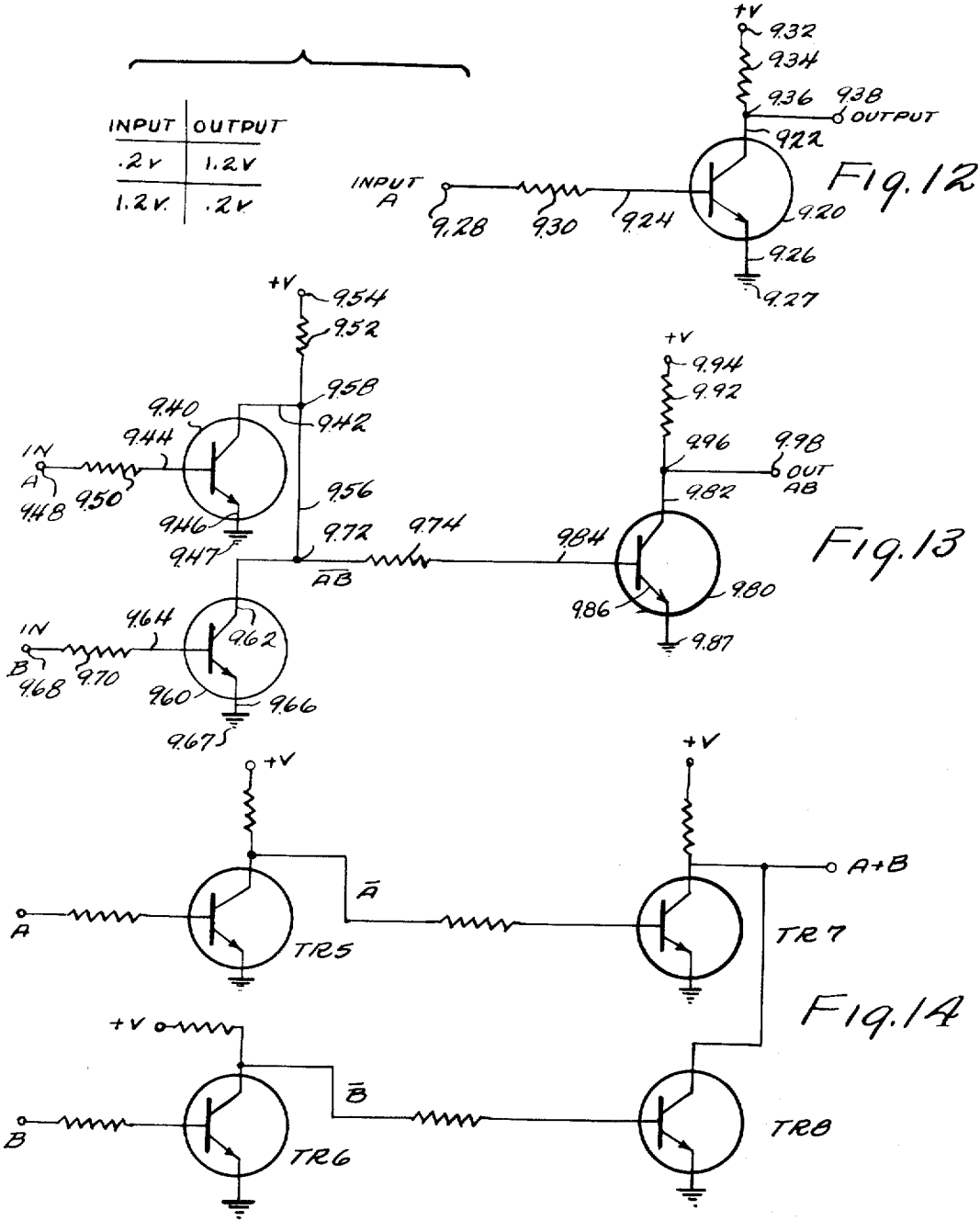

Oct. 10, 1967   J. E. THORNTON ET AL   3,346,851
SIMULTANEOUS MULTIPROCESSING COMPUTER SYSTEM
Filed July 8, 1964   21 Sheets-Sheet 13

| 10.00 | 10.02 | 10.04 | 10.06 | 10.08 | 10.10 |
|---|---|---|---|---|---|
| .2r | .2r | 1.0r | .2r | .2r | 1.2r |
| .2 | 1.2 | .2 | 1.2 | 1.2 | .2 |
| 1.2 | .2 | .2 | 1.2 | 1.2 | .2 |
| 1.2 | 1.2 | .2 | 1.2 | 1.2 | .2 |

INVENTORS
JAMES E. THORNTON
SEYMOUR R. CRAY
BY Cushman, Darby & Cushman
ATTORNEYS Oct. 10, 1967   J. E. THORNTON ET AL   3,346,851
SIMULTANEOUS MULTIPROCESSING COMPUTER SYSTEM
Filed July 8, 1964   21 Sheets-Sheet 14
| SYMBOL | LOGICAL FUNCTION | SIGNIFICANCE |
|---|---|---|
| → | INVERSION | TRANSISTOR INCLUDING BASE RESISTANCE |
| ☐ | OR COMBINATION | COLLECTOR LOAD RESISTANCE |
| ○ | AND COMBINATION | COLLECTOR LOAD RESISTANCE |
*Fig. 17a*
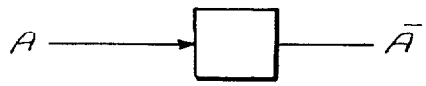
*Fig. 17b*
*Fig. 17c*
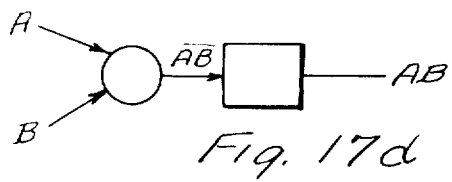
*Fig. 17d*
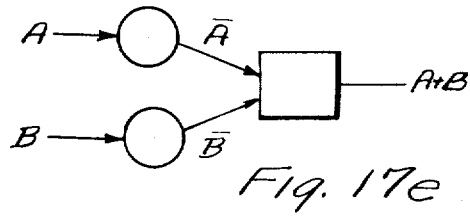
*Fig. 17e*
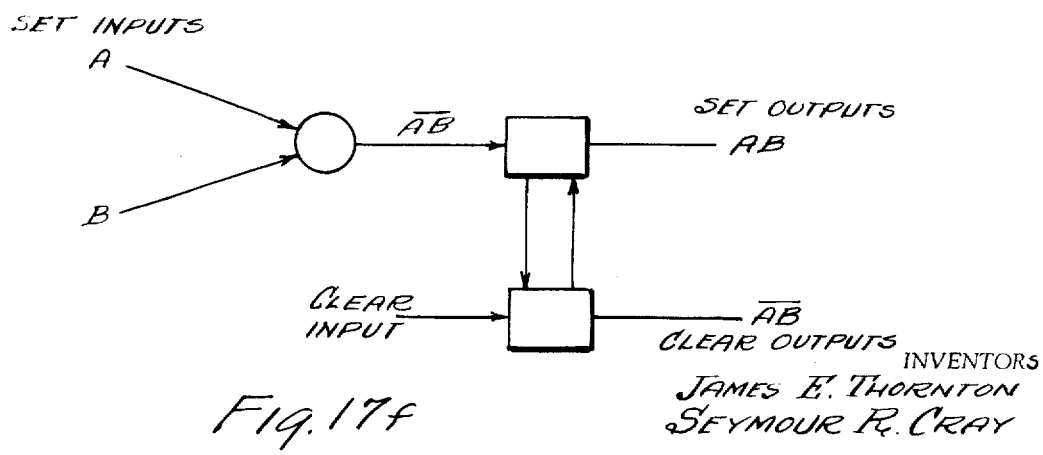
*Fig. 17f*
INVENTORS
JAMES E. THORNTON
SEYMOUR R. CRAY
BY Cushman, Darby & Cushman
ATTORNEYS

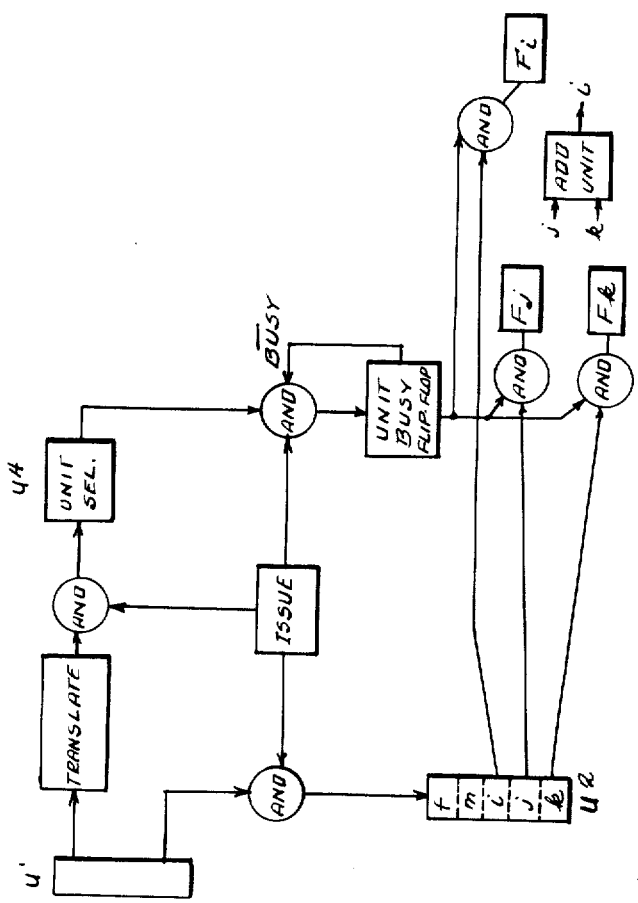

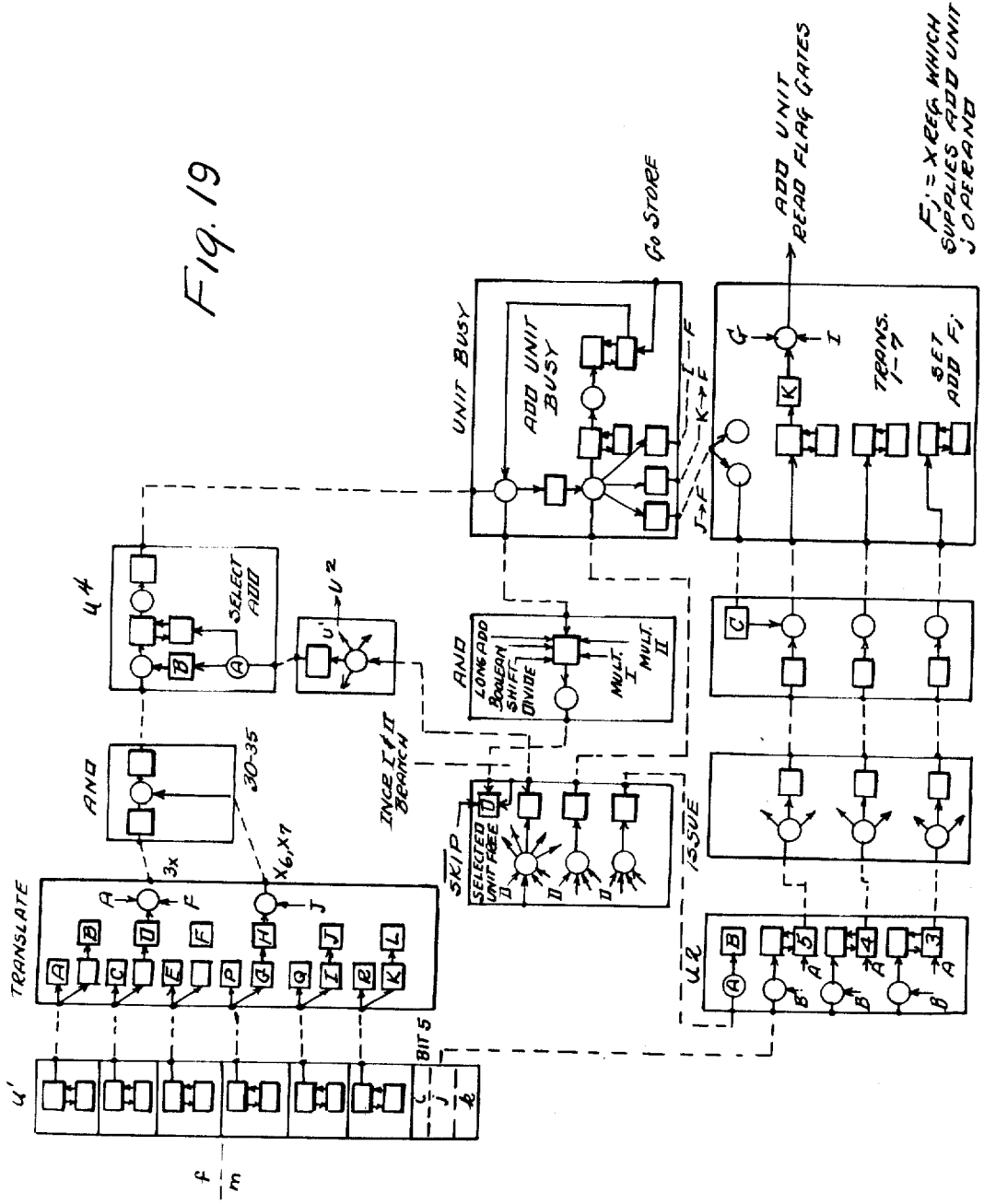

United States Patent Office 3,346,851
Patented Oct. 10, 1967

3,346,851
SIMULTANEOUS MULTIPROCESSING
COMPUTER SYSTEM
James E. Thornton and Seymour R. Cray, Chippewa Falls,
Wis., assignors to Control Data Corporation, Minneapolis, Minn., a corporation of Minnesota
Filed July 8, 1964, Ser. No. 381,076
7 Claims. (Cl. 340—172.5)

ABSTRACT OF THE DISCLOSURE

A digital computer central processer is disclosed having a plurality of arithmetic or functional units and a scoreboard for instruction control which enables simultaneous execution of a plurality of instructions from a single program.

This invention relates to a digital computer central processor and more particularly to a method and apparatus which control, in an orderly sequence, simultaneous operations of functional units in a high speed digital computer.

Digital computers have traditionally been comprised of a storage section, an input-output section, a control section, and an arithmetic or function section. The storage section provides a temporary or permanent source for computer program instruction commands and data to be operated on by the arithmetic or function section. The arithmetic or function section includes circuits which provide means for numerically manipulating the instruction commands or data in a predetermined manner, and the control section provides the control signals necessary to regulate the timing and transfers of the data being operated on. The input-output section provides means for transferring information between the digital computer and external devices.

This digital computer central processor has a plurality of functional units, each functional unit being either an arithmetic or logical unit. In addition, the digital computer central processor includes a scoreboard which has a reservation system and a control system. The reservation system allows instructions to be issued to functional units for execution in the order prescribed by the program sequence. Further, the scoreboard permits instructions to be executed out of order while retaining original program sequence. The control system allows the processing of instructions in parallel while maintaining instruction reservations. Thus, the scoreboard will maintain a high degree of continuous simultaneous operation of all the functional units. It is the scoreboard which enables the digital computer central processor to process large amounts of and complex data.

In the past, a single arithmetic unit of a digital computer was used for all calculations. Historically, the computer could only perform one arithmetic or logical operation at a time thus limiting the unit to serial operation. When a faster processing time was desired, it was obtained by designing the unit to perform its calculation or operation at a faster speed. Other computers obtained an even faster net calculation time by concurrently applying data to the unit while retrieving a calculated result from the unit.

Subsequently, computers were designed to have several functional units. Each functional unit was designed specifically to perform its arithmetic or logical operation in the shortest possible time. However, the units were still used in serial operation. The overall computation time required by a computer was decreased because of the shortened calculation times of each functional unit.

Several modern high speed digital computers have attempted to keep a plurality of functional units in concurrent operation. However, true concurrent operation of several functional units heretofore has not been achieved. A primary limitation is the complexity of the control system which restricts the theory of operation and imposes limits on advanced system design techniques. The computation time of a computer can be decreased by either performing several arithmetic operations concurrently or by using electrical components which operate faster. Since true concurrent operation is a limitation, much attention has been directed toward improving and increasing the speed of solid state electronic components and circuits used in a computer. The most significant improvements have been in the extremely fast switching speed of a transistor in switching from saturation to cut-off and in the packaging technique of the circuits. Subsequently, faster electrical circuits using the improved electronic components were designed resulting in faster overall computer processing time. Now it appears that limitations in electrical characteristic of electrical components are being reached. Any improvement to be made in electrical components or circuit packaging techniques is dependent on new technological advances or designs. Therefore, it is an object of this invention to provide a digital computer central processor which combines a new reservation and control system for permitting parallel operation of a plurality of functional units which includes the use of extremely fast solid state electronic components thereby yielding a large-scale, solid state, general purpose digital computing system.

Another object of this invention is to provide a digital computer central processor which has a plurality of arithmetic or logical functional units which are capable of simultaneous operations.

Yet another object of this invention is to provide common operational registers which can be used by any of the functional units for the receiving or storing of numerical data.

A further object of this invention is to provide a scoreboard which is capable of reserving and controlling continuous simultaneous operation of all the functional units.

Still a further object of this invention is to provide a scoreboard which can receive instructions in the order prescribed by an original program sequence and permit the instructions to be executed out of order while maintaining the original program sequence and while sustaining a high degree of continuous, simultaneous operation of the functional units which perform the requested instruction.

Yet another object of this invention is to provide a reservation system which can reserve a predetermined functional unit for a subsequent calculation and which can reserve certain of common operation registers for specific use by the reserving functional unit.

Still another object of this invention is to provide a scoreboard which not only allows and controls simultaneous operation of the functional units, but further permits concurrent entering and exiting of operands and results into and out of the functional units unless a reservation conflict is confronted.

Still a further object of this invention is to provide a plurality of instruction storage registers which are capable of maintaining an extremely high volume of program sequences for issue by the reservation system.

Another object of this invention is to provide a source of numerical data which cooperates with the operational registers under control of the reservation system including an addressing scheme having relative boundaries for reference.

One other object of this invention is to set forth a reservation system which is capable of allowing and controlling high speed transfer of data into and out of digital data central processor.

One further object of this invention is to provide a digital data central processor which is capable of utilizing high speed transistor circuits which operate in the nanosecond range.

These and other objects and the entire scope of the invention will become more fully apparent when considered in light of the following detailed description of an illustrative embodiment of this invention and from the appended claims.

FIGURES 7a and 7b illustrate in a block diagram the functional units shown in FIGURES 1 and 2, and the X group operational registers and their associated reservation designators.

FIGURE 8 is a logic diagram of the scoreboard.

FIGURE 10 illustrates the X operational registers and a chart illustrating the unit code reserved therein during the operation of the digital data central processor.

FIGURE 11 is a timing chart illustrating the timing of successive instructions as executed by the digital data central processor under scoreboard control.

FIGURE 12 illustrates a typical transistor amplifier which may be utilized in the scoreboard.

FIGURE 13 illustrates a typical AND gate utilizing the transistor amplifier of FIGURE 12.

FIGURE 14 illustrates a typical OR gate utilizing the transistor amplifier of FIGURE 12.

FIGURES 17a through 17f are logical symbols illustrating the basic electrical circuits set forth in FIGURES 12 through 15.

FIGURE 18 is a logic diagram illustrating a typical Set F designator sequence of the scoreboard.

FIGURE 19 illustrates in detail the Set F designator sequence operation in logical block form.

Briefly, this invention is directed towards a data processing system comprising a plurality of functional units to perform calculations on numerical data to produce a result. A plurality of registers are coupled to the functional units and are capable of containing numerical data and results upon which the functional units can perform calculations. A control means is coupled to the functional unit and to the registers. The control means is capable of receiving instructions sequentially and has a means for reserving a selected function unit from the plurality of functional units. Also the control means includes means for reserving specified registers from the plurality of registers for numerical data and results in response to a received instruction. The control means includes means for providing concurrent execution of functional units in cooperation with the specified registers, means for designating when a conflict in use of the specified register exists, means for delaying the calculation of the selected functional unit until the designating means designates that the numerical data is available, including results of other functional units, means for allowing the selected functional unit to calculate and retain its result until the designating means designates that the specified register is clear to receive the result.

Figure 1:
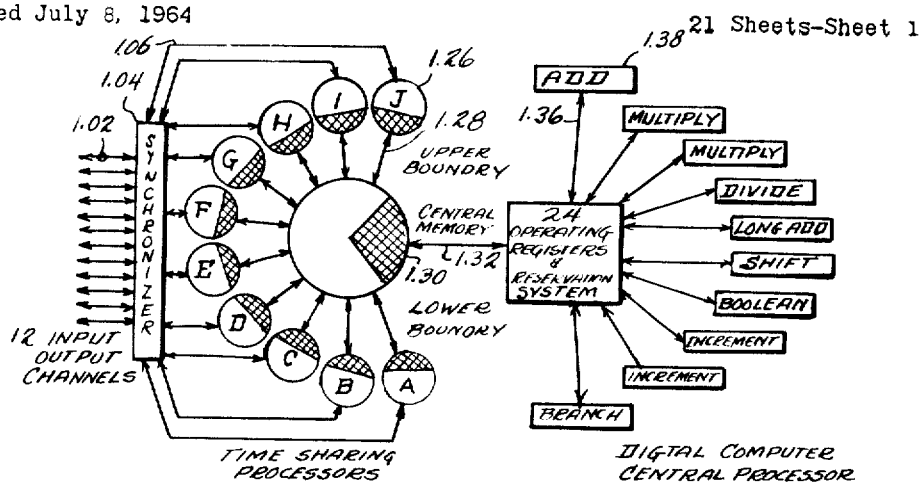
FIGURE 1 is an overall diagram illustrating the general arrangements between the digital data central processor, a central memory and a plurality of time-sharing processors.

FIGURE 1 is an overall diagram illustrating the general arrangements between the digital computer central processor, a central memory, and a plurality of time-shared processors. The illustration is a typical embodiment depicting a nearly ideal overall digital computer system having twelve separate input-output channels, of which 1.02 is typical, for communication with magnetic tape transports, magnetic disc memories, card readers, data display equipment and other external pieces of peripheral equipment. The twelve input-output channels are connected to a synchronizer 1.04 which subsequently communicates with one of the ten time-shared processors. The synchronizer may be of the type which is known in the computer art. Line 1.06 is typical of a communication line between synchronizer 1.04 and the J peripheral processor denoted as element 1.26. A co-pending application, Ser. No. 381,072, entitled Time Sharing Processor by Seymour R. Cray and James E. Thornton filed July 8, 1964 discloses in detail the time-shared processors. Thereafter, the processor 1.26 communicates via a communication line, of which 1.28 is typical, to a central memory 1.30. The central memory may be any storage device, for example a magnetic core memory, which is well known in the art. The central memory 1.30 is a common element between the input-output, the time-shared processors, and the digital computer central processor. Generally, the data stored in the central memory 1.30 is utilized by the digital computer central processor. A communication channel 1.32 connects the central memory 1.30 to the twenty-four operating registers and reservation system denoted as 1.34 which shall be discussed in detail hereinafter. The operating registers and reservation system 1.34 thereafter passes data to the plurality of function units, of which the add unit 1.38 is typical, via trunk lines of which 1.36 is typical. The functional unit may comprise any known arithmetic or logical unit utilized in a digital computer to perform a calculation. When the functional unit 1.38 for example has completed a calculation, the result is passed via trunk line 1.36 back to the operating register and reservation system 1.34 for use by another functional unit, or for storage back into the central memory 1.30 via communication line 1.32.

During a typical operation of the above described digital computer system, as many as ten input-output channels can be transmitting or receiving data simultaneously to any of the ten time shared processors. The data is normally transmitted, received and processed by time-shared processor in twelve bit binary quantities. The time-shared processor thereafter can perform certain arithmetic and logical operations on the data to prepare the data in a format for storage in the central memory 1.30. A word stored in the central memory 1.30 is a sixty bit quantity. Thus, the time-shared processors A through J pack the data into the central memory in twelve bit quantities to produce the sixty bit word. Thereafter, the data is passed from the central memory 1.30 to the digital computer central processor. The communication between the central memory 1.30 and the central processor is such that the upper and lower boundaries of the data in memory are completely relative with respect to each other. Thus, the addressing of the central memory 1.30 by the twenty-four operating registers and reservation control 1.34 is accomplished using the lower boundary as the reference address. Thus, the use of the entire digital computer system, and specifically the inventive digital computer central processor, is completely dependent on program control.

Figure 2:
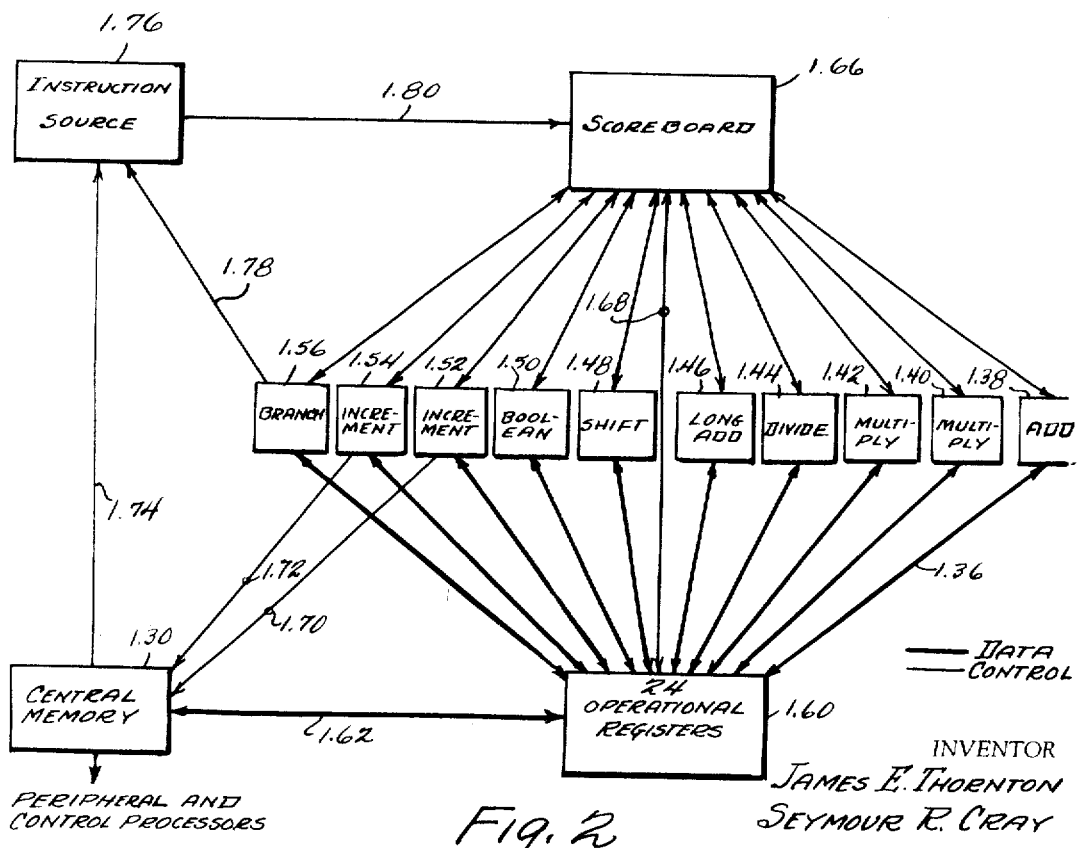
FIGURE 2 is a block diagram which illustrates the components of the digital data central processor.

FIGURE 2 is a block diagram illustrating the components of the digital computer central processor. The functional units, specifically add unit 1.38, a first multiply unit 1.40, a second multiply unit 1.42, a divide unit 1.44, a long add unit 1.46, a shift unit 1.48, a boolean unit 1.50, a first increment unit 1.52 a second increment unit 1.54 and a branch unit 1.56 are shown. Each function unit is connected via a trunk line, for example, trunk line 1.36 from add unit 1.38, to the twenty-four operational registers 1.60. The heavy trunk lines indicate that numerical data flows between the functional units and the twenty-four operating registers. The twenty-four operating registers 1.60 are connected via communication channel 1.62 to the central memory 1.30. Channel 1.62 is used to carry data from the central memory, which is a numerical data source, to the registers 1.60. The functional units are controlled by a scoreboard 1.66. Control lines are used to connect a function unit to the scoreboard 1.66. For example, add unit 1.38 is connected to the scoreboard 1.66 via control line 1.64. The control lines are indicated in a light line as compared to the heavier data lines. Also, a control line 1.68 is utilized to connect the scoreboard 1.66 to the 24 operational registers 1.60.

Two of the functional units, the first increment unit 1.52 and the second increment unit 1.54 communicate directly to the central memory 1.30 via lines 1.70 and 1.72 respectively. The central memory 1.30 is connected to an instruction stack 1.76 via line 1.74. The branch functional unit 1.56 also is connected to the instruction stack 1.76 via line 1.78. The instruction stack 1.76 is subsequently connected to the scoreboard 1.66 via line 1.80.

Very generally, the overall operation of the digital computer central processor is as follows: a program is stored in the central memory 1.30 by means of the time-shared processors. The program is initiated by an exchange jump programmed command from a time-shared processor which directs instruction from the central memory 1.30 to the instruction source 1.76 via line 1.74. Concurrently, numerical data from the central memory 1.30 is passed to the twenty-four operational registers 1.60 via line 1.62. Thereafter, an instruction is issued from the instruction source 1.76 to the scoreboard 1.66 via line 1.80. The scoreboard 1.66 reserves the functional unit necessary to perform the instruction calculation and reserves certain of the operational register for use by that functional unit. While the functional unit is performing the first instruction, the scoreboard 1.66 allows another instruction to issue, and then proceeds to have that instruction performed simultaneously with the initial instruction. The scoreboard will allow instructions to be issued and performed simultaneously until a conflict of functional units or of registers is encountered. Thus, the scoreboard tends to keep the functional units in a high degree of simultaneous operation. Numerical data passes from the twenty-four operational registers 1.60 to the functional units and back over the trunk lines. The control of the functional units by the scoreboard 1.66 is accomplished via the control lines between the functional units and the scoreboard 1.66. The lines 1.70 and 1.72 extending from the first and second increment units respectively and the line 1.78 from the branch unit 1.56 to the instruction source 1.76 are special purpose controls and are used to address central memory and to control branching operation respectively.

Figure 3:
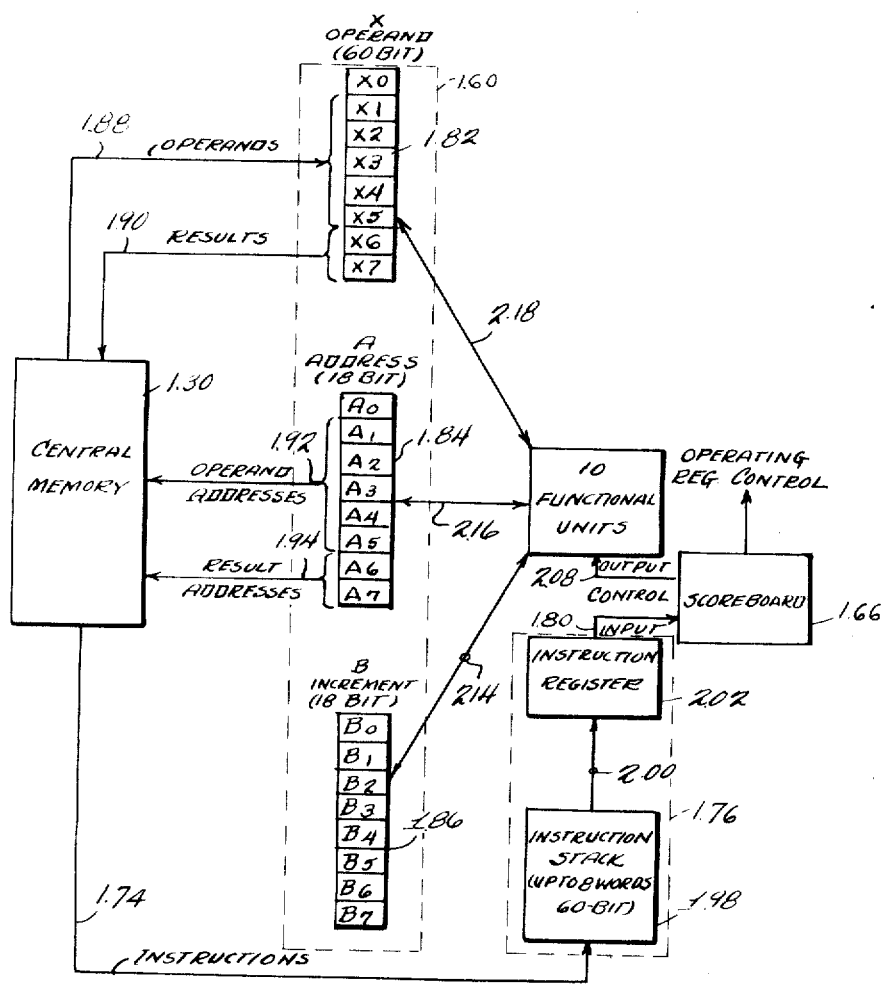
FIGURE 3 is a block diagram indicating the functions of the various components of the digital data central processor.

FIGURE 3 is a block diagram indicating the function of the various components of the digital data central processor. The twenty-four operational registers are subdivided into the three groups, group X operand registers 1.82, A address registers 1.84 and B increment registers 1.86. The X operand registers 1.82 are sixty bit registers comprising eight separate registers X0 to X7. The X operand registers X1–X5 are capable of receiving numerical data in sixty bit quantities from the central memory 1.30 via trunk line 1.88. The X result registers X6 and X7 are capable of storing numerical data results of sixty bit quantities in the central memory 1.30 via trunk line 1.90. Register X0 is utilized for temporary storage of numerical data and cannot receive or store numerical data with respect to the central memory 1.30.

The A address registers 1.84 are eighteen bit registers comprising eight separate registers A0 to A7. The A address registers are coordinated with the X operand registers in that the address of the operand in the X register is stored in a corresponding A address register. For example, the sixty bit operand in the $X_1$ register was located in the central memory 1.30 at the 18 bit address in the corresponding $A_1$ Register. Thus, the $A_1$ to $A_5$ address registers contain operand address of the operands stored in registers $X_1$ to $X_5$ while the $A_6$ and $A_7$ address registers contain the result address for the $X_6$ and $X_7$ results. The address registers $A_1$ to $A_5$ address the central memory 1.30 via line 1.92, while the address registers $A_6$ and $A_7$ address the central memory 1.30 via line 1.94. A change to an A1–A7 address register loads the corresponding X1–X7 operand register.

The B increment registers 1.86 are 18 bit registers comprising eight separate registers B0 to B7. The B increment registers are used by the shift functional unit, and the first and second increment units are used for special operations associated with those units.

The central memory 1.30 passes the program instructions to the instruction stack 1.98 via line 1.74. The instruction stack is capable of holding eight sixty bit words of instruction. The instruction stack issues an instruction to the instruction register 2.02 via line 2.00. The issued instruction passed from the instruction register 2.02 to the scoreboard 1.66 via line 1.80 which may be considered an input into the reservation system 1.66. The scoreboard 1.66 then determines which functional unit will be necessary to execute the instruction and which operational registers are to be used by the selected functional unit. Thus, the scoreboard 1.66 via output line 2.08 selects and reserves the necessary functional unit out of the ten functional units 2.12, selects and reserves the A address registers over trunk line 2.16, and selects and reserves the B increment registers 1.86 over trunk line 2.14.

Since the basic overall digital computer central processor has been disclosed, it is advantageous to discuss via diagrams, the central processor operation in detail.

Figure 4:
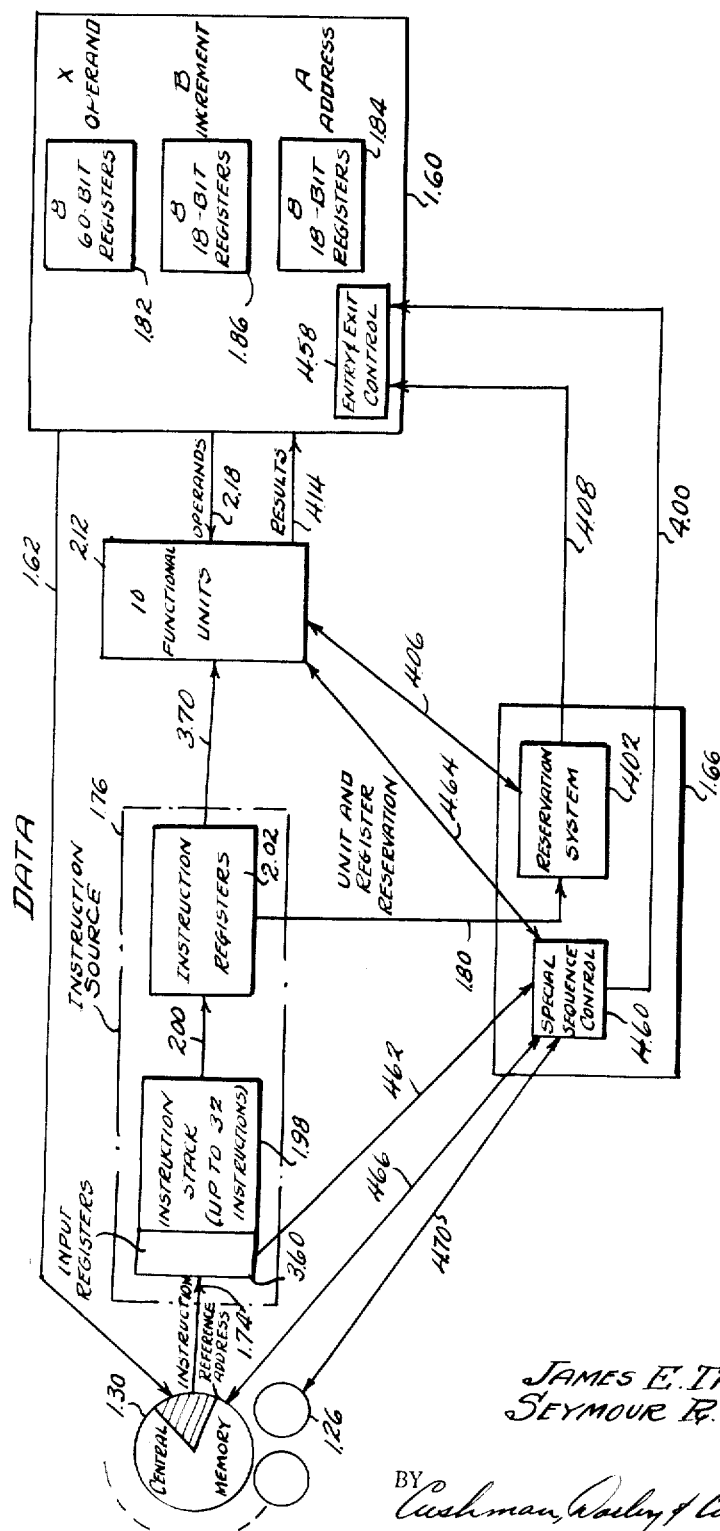
FIGURE 4 illustrates in an overall diagram the relationship between the various components and the scoreboard which controls their operation.

Refer now to FIG. 4 which illustrates in an overall diagram, the relationship between the various components and the scoreboard which controls their operation. The central memory 1.30 provides instructions and data to the central processor. The instructions are passed from the central memory 1.30 via the instruction transmission line 1.74 to the instruction control 1.76. Concurrently, data is passed from the central memory 1.30 via a data trunk line 1.62 to the central processor operating registers and operating registers entry and exit control. The instruction control source 1.76 receives and temporarily stores the instruction in an input register 3.60. The instruction is then stored in an instruction stack 1.98 which holds up to thirty-two instructions. An instruction is issued from the instruction stack 1.98 via line 2.00 to instruction registers 2.02. The instruction register 2.02 passes the instruction to the scoreboard 1.66 via unit and register reservation line 1.80. Concurrently, the instruction is attempted to be issued to one of the ten functional units 2.12 via line 3.70. The scoreboard 1.66 has a reservation system 4.02 which receives the instruction from the instruction register 2.02 via line 1.80. The reservation system 4.02 receives the instruction, determines if the requested functional unit is in use, or if the necessary registers are reserved, and then directs the requested functional unit to receive the instruction and to allow the calculation. The reservation system 4.02 communicates with the ten functional units 2.12 via line 2.08. The reservation system 4.02 also controls and reserves the various operational registers of the central processor's operating registers and operating registers entry and exit contol 4.58. Referring now to registers and control 1.60, the data received via line 1.62 is stored in X operand registers 1.82 for use by the ten functional units 2.12. The A address registers 1.84 contain the addresses of the data stored in the X operand registers 1.82. The B increment registers 1.86 are used by the ten functional units when executing special instructions.

When one of the ten functional units of 2.12 is to perform a calculation, the operands for the functional unit are transmitted from the X operand registers 1.82 to the functional units 2.12 via operand data trunk line 2.18. When a functional unit has completed the calculation, the results are transmitted from the functional units 2.12 to the appropriate register in the operational register unit 1.60.

This flow of data and instructions just described relates to the normal or usual operation. However, in special cases it becomes desirous to utilize a special sequence which requires other than normal operation. A special sequence control 4.60 is part of the scoreboard 1.66. A special sequence can be initiated by an instruction. When a special sequence instruction is received by the input register 3.60, that instruction is transmitted to the special sequence control 4.60 via line 4.62. The special sequence control 4.60 communicates with the ten functional units via line 4.06. Also, the special sequence control reserves a functional unit and register by directly communicating with the operational register unit 1.60 via line 4.64. Line 4.64 communicates with the operational register unit 1.60 via the entry and exit control 4.58. The special sequence control 4.60 can directly communicate with the central memory 1.30 via line 4.66 or with a time sharing processor 1.26 via line 4.70.

Since the invention is directed primarily toward the digital computer control processor and its ability to allow simultaneous operations of functional units, emphasis will be placed on the normal or usual operation, keeping in mind however, that special sequence variation can and does exist.

Figure 5:
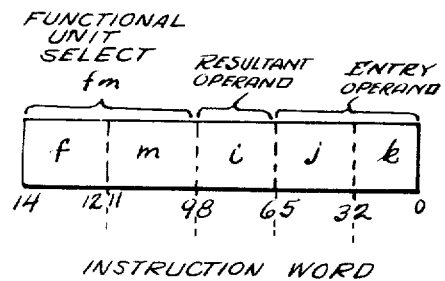
FIGURE 5 is an illustration of the format of a 15 bit instruction which is to be executed by the digital data central processor.

FIGURE 5 is an illustration of the format of a fifteen bit instruction which is to be executed by the digital data central processor. The typical instruction is fifteen bits in length, which bits are designated 0 to 14 in FIGURE 5. The highest order six bits 9 to 14, are designated by the letters $f$ and $m$, each letter representing three bits. The $fm$ portion of the instruction designates which functional unit is to perform an operation. When a functional unit is selected, that functional unit is capable of performing a single arithmetic or logical operation. Thus, the instruction by selecting a certain functional unit also directs the operation to be performed.

The remaining lower order bits, bits 0 to 8, designate which of the twenty-four operational registers are to contain the entry operands upon which a predetermined functional unit is to perform its operation; and which operational register is to store or receive the result operand from the functional unit. The operational register which is to receive the result operand is designated by letter $i$ and by bits 6 to 8. The operational registers which are to contain the entry operands are designated by letters $j$ and $k$ by bits 3 to 5 and bits 0 to 2 respectively.

Figure 6:
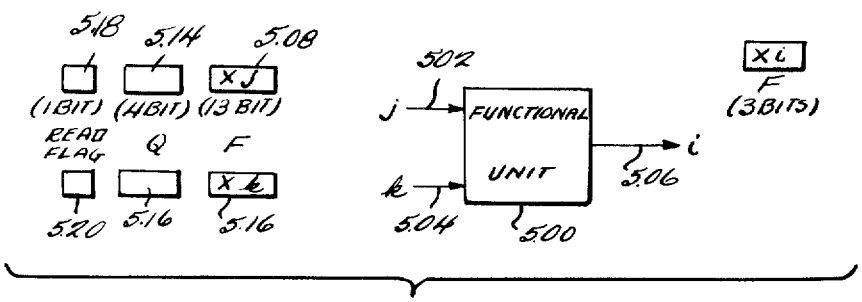
FIGURE 6 illustrates in a block diagram a typical functional unit and its associated reservation designators and read flags.

FIGURE 6 illustrates in a block diagram a typical functional unit and its associated reservation designators and read flags. A functional unit 5.00 has inputs $j$, 5.02, and $k$, 5.04, from the operational registers which pass the entry operands into the functional unit from the operational registers. The result operand is passed by output $i$, 5.06, to the operational register designated to it.

Referring now to FIGURE 6, assume the illustrative functional unit 5.00 is restricted to use the X operational register group. However, certain of the functional units will utilize the A and B operational register groups as will be explained hereinafter.

The functional unit 5.00 has two entry operands inputs 5.02 and 5.04. Where an entry operand is to be applied to input 5.02, the entry operand is denoted as the $j$ operand. When an entry operand is to be applied to input 5.04, that operand is denoted as the $k$ operand. Functional unit 5.00 has a resultant operand output 5.06. When the resultant operand emanates from 5.06, it is denoted as the $i$ operand.

Each entry operand input receives its entry operand from the X operational register group. Thus each input must receive the entry operand from a predetermined register within the group. Before the entry operand can be received by the functional unit, the appropriate operational register must be designated or known to the input. This is accomplished by an F designator for each input. The F designator is a three bit register and will be set to identify which one of eight operational registers in a group is to contain the operand. For example, if the $X_1$ operational register is to contain an entry operand, the three bit F designator will be set to 001. The F designator 5.08 is associated with the 5.02 input and contains the $j$ entry operand. This is designated as the $X_j$ operational register. Similarly, the F designator 5.10 is associated with the 5.04 input and contains the $k$ entry operand. This is designated as the $Xk$ operational register.

The resultant operand output 5.06 must store its result in one of the X operational register groups. Thus, the register which is to be the result operand register is identified or designated by F designator 5.12 and will contain the $i$ resultant operand. This is designated as the $Xi$ operational register.

Refer again to the entry operand inputs 5.02 and 5.04 and the F deginsator 5.08 and 5.10 associated therewith. During the operation of the functional unit, it is possible that an operational register in use will be requested by another functional unit. However, since the requested register is in use by functional unit 5.00, the requesting functional unit can reserve the necessary operational register. This is accomplished by queue designators (hereinafter designated as Q designator) 5.14 and 5.16. The Q designator 5.14 is associated with the $Xj$ or 5.08 F designator and the Q designator 5.16 is associated with the $Xk$ or 5.10 designator. Each Q designator is a four bit register. If a requesting functional unit needed an X operational register which presently contained the $Xj$ operand, the requesting unit unit would place or store its octal code designation in the Q designator. Since it had been assumed that the $Xj$ operand was using the X operational register, the Q designator 5.14 would be set to designate that a reservation had been placed. Each Q designator is further associated with a 1 bit read flag designator. Q designator 5.14 has a read flag designator 5.18 associated therewith, while Q designator 5.16 has a read flag designator 5.20 associated therewith. When a Q designator contains a reservation, the associated read flag will be set only when the functional unit identified by Q has returned its results. When both read flags have been so set, the unit 5.00 is allowed to read its $j$ operand and $k$ operand and prepare a result. Conversely, the unit may not send its result on the $i$ channel 5.06 until any and all read operands previously flagged have been read.

The above description is very general and will be explained in greater detail hereinafter. The scheme becomes somewhat more complicated when additional register groups B and A are used by certain of the functional units. Each register group has a reservation designator associated only with the functional units which can use them. Also each group reservation designator utilizes the common Q designator, but has a read flag designator associated therewith. However, in the embodiment to be described hereinafter, a majority of the algebraic and logical functional units will use only the X group registers.

Figure 7A:
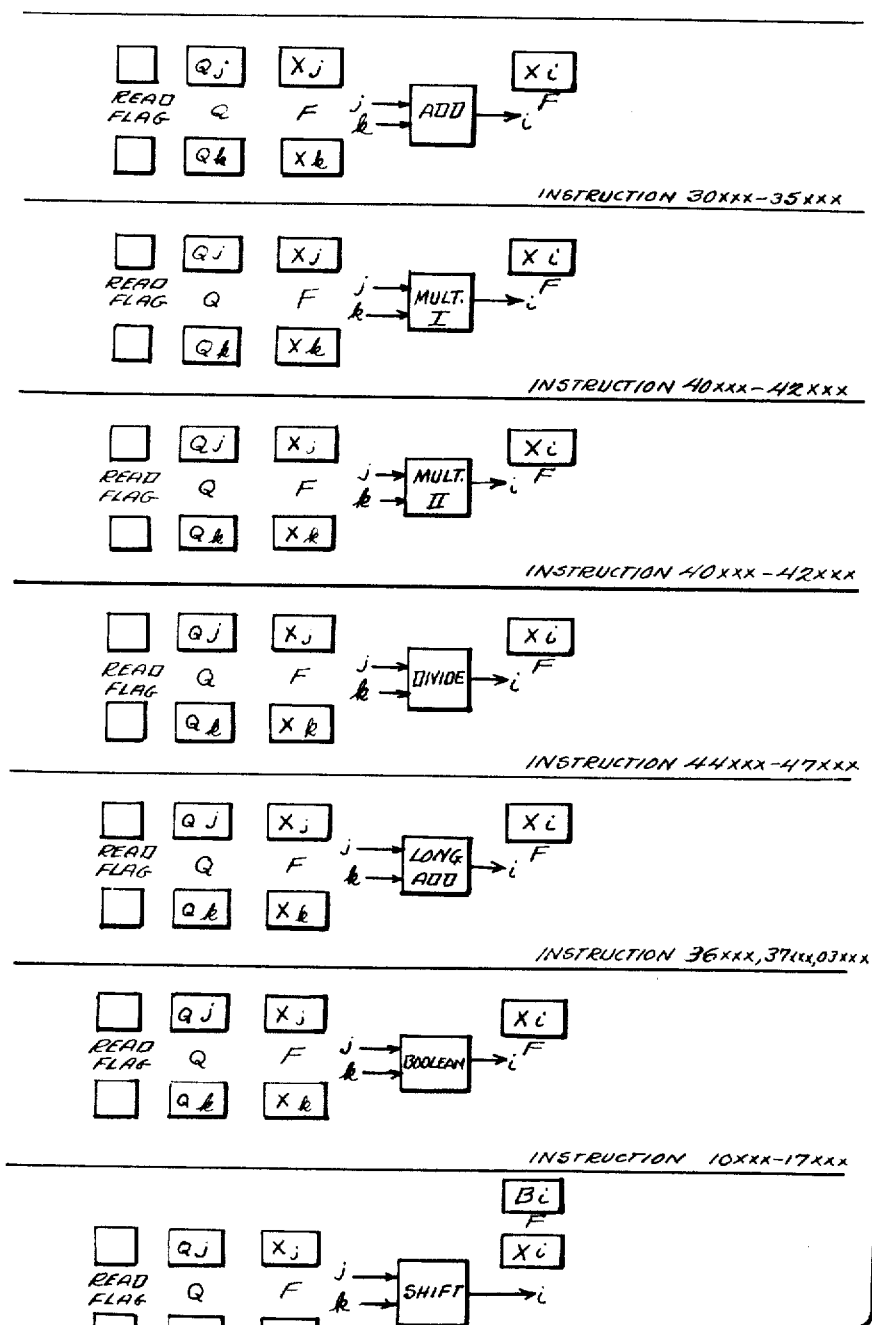

FIGURES 7a and 7b illustrate in a block diagram the functional units and the F designators, Q designators and read flag designators associated therewith. Also illustrated in FIGURE 7b are various F designators, Q designators and read-flag designators associated with the X group operational registers. Since the X group of registers contains the operands for a majority of the functional units, it is necessary that each register has a designator for the purposes of reservation. Table A, located hereinbelow, lists the functional units and the X register channels and includes an octal code designation associated with each functional unit or register. It is this octal code which is used with the Q designators within the reservation scheme.

TABLE A

*Q designators (octal)*

| | |
|---|---|
| Branch | 00 |
| Increment I | 01 |
| Increment II | 02 |
| Shift | 03 |
| Boolean | 04 |
| Divide | 05 |
| Multiply I | 06 |
| Multiply II | 07 |
| Read memory channel: | |
| $X_1$ | 11 |
| $X_2$ | 12 |
| $X_3$ | 13 |
| $X_4$ | 14 |
| $X_5$ | 15 |
| Long add | 16 |
| Add | 17 |

The functional units which use only the X group operational registers are the add, multiply I, multiply II, divide, long add and Boolean units.

As discussed hereinbefore, the *fm* portion of the instruction contains the six bit instruction code. It is the *fm* portion of the instruction which designates which functional unit is to perform a calculation. Thus, by means of two octal digits, each functional unit can be selected or identified.

Referring to the add functional unit shown in FIGURE 7a, this unit is referenced when an instruction has the instruction code designation of 30 through 35. Since the add unit requires only the X group operational registers, the unit will only need the F designators, Q designators, and read-flag designators.

The multiply I functional unit is referenced by instruction codes 40 through 42 and only uses the X group operational registers.

The divide functional unit is referenced by instruction codes 44 through 47 and uses only the Y group operational registers.

The long add functional unit is referenced by instructional codes 03, 36, and 37. The long add unit only utilizes the X group operational registers.

The Boolean functional unit is referenced by instruction codes 10 through 17 and only uses the X group operation registers.

The shift functional unit is referenced by instruction codes 20 through 27 and 43. The shift unit, for its operation must receive one of its entry operands from a B group register, and must receive its other entry operand from an X group operational register. The shift unit's resultant operand may be stored in either the X group or B group operation registers.

There are two functional units which utilize the X, B and A group operational registers. The two functional units are the Increment I and the Increment II. Each increment unit is referenced by instruction codes 02, 04, through 07, 50 through 57, 60 through 67 and 70 through 77. The Increment I functional unit can reecive one of its operands from either an A group, B group or X group operation registers and must receive its other entry operand from the B group operational registers. Thus, each entry operand has an F designator for each group operational register. The Q designator is commonly used by all of the group operation registers. However, there is a separate read-flag designator for each group operational register F designator. The resultant operand from the Increment 1 unit can be passed or stored to either the X, B or A group operational register.

The increment unit is also capable of addressing the central memory directly. As stated hereinbefore, the A address register contains the address of an operand which is to be stored from memory in the X register, registers $A_1$ to $A_5$, or the address of an operand which is to be stored from the X register to memory, registers $A_6$ to $A_7$. After the increment unit addresses the appropriate A register, the transfer of data between the X register and memory can be considered an autonomous memory control operation. Each increment unit has a set of designators for the purpose of addressing. The designators include a read flag, a $Q_{mem}$ designator and an F designator. The $Q_{mem}$ is set for only memory operations on $A_6$ or $A_7$. The F designator is used as $F_j$ or $F_k$ in $A_6$ or $A_7$ operations or as $F_i$ in $A_1$ to $A_5$ operations. In either case, the operation once initiated by the increment unit, is handed over to an autonomous memory control. The Increment II functional unit is identical to the Increment I functional unit.

As described hereinbefore, the X group operational registers are the only registers which can communicate directly with the central memory. The X group operational registers are restricted to either receiving data in the X registers from the memory or for storing data into the central memory. The X1 through X5 registers are capable of receiving data from the central memory. However, data can only be transferred from the X register to the central memory from registers X6 and X7. The X6 and X7 registers have a Q designator and an associated read-flag designator. The Q designator and the read-flag designator are necessary for controlling data storage in the central memory.

Now that the individual function units, operational registers and their associated designators have been considered separately, a discussion of the scoreboard itself which includes the placing of a reservation and the operation control will be considered.

FIGURE 8 is a logical diagram illustrating the scoreboard. The actual operation of the scoreboard may broadly be subdivided into two functions. The first function is to place reservations and the second function is to control the operation or the execution of the placed reservation. The two functions are not independent, that is, each function must cooperate with the other to receive or test for certain conditions. However, the two functions are independent when considered from their functional standpoints. This paradox will become apparent in light of the following discussion.

Assume that an instruction has been placed in an instruction source, and that the scoreboard of FIGURE 8 receives an instruction from the instruction stack (not shown) via line 1.80. Line 1.80 will store this instruction in a $U^1$ register 5.98. The instruction stored in the $U^1$ register 5.98 will be in the format as shown in FIGURE 5. Thereafter, the instruction in the $U^1$ register 5.98 will be applied to a $U^2$ register and check result reservation unit 6.02 via line 6.00. The $U^2$ register will then contain the *i*, *j*, and *k* portions of the instruction. As previously stated, the *i*, *j*, and *k* portions each identify an operational register within the X–B–A groups of registers. The identified register is to contain either a resultant operand or one of two entry operands respectively. The $U^2$ register will check and determine if the operational register which is to receive the resultant operand is reserved for the result of another functional unit. If the operational register designated by *i* is reserved, the condition will be determined by unit 6.02 and will be used in placing reservation sequence to be discussed hereinafter. The *j* and *k* designations of the operational registers which are to contain the entry operands are available, but are used later in the placing reservation sequence.

The instruction which is stored in the $U^1$ register 5.98 will have the *fm* portion thereof passed to a translate instruction unit 6.08 via line 6.04. The translate unit 6.08 will translate the *fm* portion of the instruction into a select code to select the appropriate functional unit. Thereafter, the select code is passed via line 6.10 to a $U^4$ register 6.12. The $U^4$ register 6.12 then selects the appropriate functional unit 6.16 via line 6.14. The functional unit 6.16 is identified by the select code corresponding to the *fm* portion of the instruction.

When the functional unit 6.16 is selected by the $U^4$ register 6.12, one of two things will happen. If the unit is busy, that is reserved by or is presently being used by another instruction, the select code will remain a request until the unit is free. If the unit is free, the select code for the functional unit will be honored by that unit. The functional unit 6.16 will set a unit busy flip-flop (indicated as part of the functional unit 6.16). Thus, the functional unit necessary to to execute the instruction will be reserved.

The $U^2$ register 6.02 and $U^4$ register 6.12 have then determined two important conditions. Is the requested functional unit free (derived from the *fm* portion of the instruction); and is the operational register which is to receive the resultant operand not reserved for the results of another issued instruction (derived from the *i* portion of the instruction)?

The third output 6.06 from the $U^1$ register 5.98 will apply the instruction to a translate section 6.20 which translates the *fm* portion of the instruction into an operational register group selection code. This indicates whether the X, B, or A group operational registers are to be used. Thereafter, the select flip-flop combine the operational register group selection with the *i*, *j* and *k* portion of the instruction code from the $U^2$ register to select which operational registers are to contain the operand. This is shown on FIGURE 8 as line 6.03 from the $U^2$ register 6.02 to select flip-flop unit 6.24. Thereafter, the selected operational registers are combined with the requesting functional units and a unit code is determined, which code is to be placed in an operational register designator being reserved for the operand. Line 6.13 from the $U^4$ register to the select flip-flop unit 6.24 is used to determine the unit code. An example of the operation of the translate unit 6.20 and the select flip-flop unit 6.24 would be to consider that the *fm* portion of a 44XXX (octal) instruction requesting the divide unit. The 44 would be translated into a unit code of 05 (octal) and would be placed in the X designators.

The selection and unit code of the select flip-flop unit 6.24 would be passed to the test for issue unit 6.30 via line 6.26.

The test for issue unit 6.30 is the key test which determines if an instruction can be issued to place its reservations. The test for issue unit 6.30 has an input 6.32 from the functional unit 6.16. This input is a first condition to the issuance of the instruction. This first condition must indicate that the functional unit 6.16, which is to execute the instruction is free. Input 6.32 may be referred to as the Unit free condition. A second input 6.28 from the $U^2$ register 6.02 is applied to the test for issue unit 6.30. This second condition requires that the operational register which is to receive the resultant operand must not be reserved for the results of another functional unit. Input 6.28 may be referred to as the result reservation condition.

When the test for issue unit 6.30 is properly conditioned by the two inputs, the instruction will be issued for reservations. When the instruction is issued, certain reservations are placed concurrently. One reservation sequence is to set the F*i*, F*j* and F*k* designators of the functional unit 6.16. The designators F*i*, F*j*, and F*k* will contain the data which was the *i*, *j*, and *k* portion of the instruction. The data stored in F*i*, F*j* and F*k* designates which operational registers are to have the entry operands for the functional unit and which operational register is to receive the resultant operand or results from the functional unit. In the use of the illustrative diagram, an assumption will be made that only the X group operational registers are to be used with the functional unit 6.16. Thus, the F*i*, F*j* and F*k* designators will identify the appropriate X*i*, X*j* and X*k* operational registers which that functional unit will utilize in this operation. The control and Set F unit 6.36 is conditioned by the test for issue unit 6.30 via issue line 6.34. Before the Set F unit 6.36 can be set, the F*i*, F*j* and F*k* designators were cleared by line 6.37 which occurs prior to the issue condition via line 6.34.

Another reservation sequence will be to set the Q*j* and Q*k* designators of functional unit 6.16. The Q*j* and Q*k* designators are the means for identifying prior reservations of operational entry registers. One may recall that if the operational register which is to receive the resultant operand is reserved for the results from another functional unit, the instruction, will not be issued. This condition may be determined by checking the *i* part of the instruction against all the F*i* designators of the other functional units. The need for Q*j* and Q*k* designators will become more apparent when the operation control of the scoreboard is discussed.

The prior reservation to be stored in the Q*j* and Q*k* designator includes a code of the functional unit which placed the prior reservation. Hereinafter, the functional unit which had placed a prior reservation shall be referred to as the *reserving unit* and the functional unit which is placing the current reservation shall be referred to as the *requesting unit*.

The prior reservation conflict would first be apparent when a check is made to determined if the X*j* and X*k* operational registers are reserved by a functional unit. If a prior reservation was placed by another functional unit, the reserving unit code would appear in the X*j* and X*k* operational register designator.

During the placing of reservations for the requesting unit, the reserving unit code, which is stored in the X designators, will be transferred to the Q designator of the requesting function unit. When the requesting unit requires the use of the previously reserved X operational register, a copying sequence is initiated wherein whatever appears in the X designators of the operational registers which are to contain the entry operand are copied into the appropriate Q designator of the requesting functional unit. The reserving unit code, which is now stored in the Q designator of the requesting unit, will have a priority in using the reserved X operational register. This operation will become apparent in the discussion of the operation control sequence.

After the contents of the X designator are copied into the Q designator of the requesting unit, the next step is to set the X*i* designator with the code of the reserving unit. Issue line 6.38 from the test for issue unit 6.30 conditions the set Q and set X designators at 6.40. The set Q of 6.40 is merely a copying of the contents of X*j* and X*k* which is the code of the reserving unit, into Q*j* and Q*k* respectively. The set X of 6.40 is the setting of X*i* operational register designator with the code of the requesting unit.

The last issue output 6.39 from the test for issue unit 6.30 is to the U⁴ register 6.12. This output 6.39 allows the U⁴ register to pass the request signal via line 6.14 to the functional unit to set the busy flip-flop. When this occurs, the unit free is conditioned to disable further issuance of instructions requesting the use of the requested functional unit after all of the other issue conditions relating to the issued instructions are placed.

At this point, the placing of the reservation is complete and the operation control then takes command to execute the placed reservations in a sequence which is dependent upon the availability of the functional units and operational registers.

The operation control portion becomes fairly complex. However, the following explanation is to be general in nature followed by an example of overall operation. Considering now only the requesting functional unit, 6.16, the control and set F unit 6.36 will condition a test for read operand and set read flag unit 6.42 by passing a control signal via line 6.44, and a Fj and Fk signal via line 6.46 identifying the X operational registers which are to contain the entry operand. The test for read operand and set flag unit 6.42 performs several checking functions. The basic operation of unit 6.42 is to determine if the entry operands are present within the X operational registers and if they are, the unit 6.42 allows the functional unit to read its operands out of the operational registers and to perform its calculation.

However, before the read operand sequence can occur, several conditions must be fulfilled. As discussed hereinbefore, it is possible that one of the X operational registers could have a prior reservation from a reserving unit. If this condition is present at a time when the functional unit is free and is able to perform a calculation and that entry operand which to to come from that X operational register is not available, the functional unit must wait. The test for read operand unit 6.42 then waits until the Q reservation condition input 6.48 is cleared. If a Q reservation exists, the unit must wait until the reserving unit has released its reservation.

If the Q designator does not contain a prior reserving unit, a read flag corresponding to the free Q designator will be set. If the read flag is set, this indicates that the corresponding operational register does contain the entry operand and is waiting to be read by the functional unit. Each entry operand has a corresponding Q designator and set flag associated therewith. When both Q designators are cleared or released and both read flags are set, the functional unit is then conditioned to read operands, start the unit and clear read flags. When the reserving unit clears the Q designators releasing a prior reservation, the signal requesting unit input 6.54 conditions the requesting unit's Q designator. When all conditions into unit 6.42 are proper, i.e. control input 6.44, Fj and Fk input 6.46, Q reservation condition input 6.48, signal requesting unit input 6.54, then the rest for read operands and set flag unit 6.42 will direct the functional unit via output 6.50 to read operands, will clear the read flags via clear flag output 6.52 and will tell the functional unit 6.16 to calculate via line 6.56. Then the entry operands are read into the functional unit 6.16 via inputs j and k. When a functional unit has completed its calculation, the functional unit must request permission to release its resultant operand to its predetermined X operational register.

The test for store operand unit 6.60 generally controls and grants the request to the functional unit allowing it to transmit the resultant operand to the appropriate X operational register and finally clears the X, Q, and F designators. Again, several conditions must be determined before the request release can be granted. The request release is sent from functional unit 6.16 to the test for store operands unit 6.60 via line 6.62. The first condition determined is whether the resultant operand produced by the functional unit is to be used as an entry operand for another functional unit. Thus, the unit 6.60 will have an Fj and Fk input 6.64 from each functional unit and a read set flag 6.66 from each functional unit. From these two inputs, the unit 6.60 determines if the resultant operand is to be used by another functional unit.

When the determination is made that the resultant operand is to be used, the proper Q designator is conditioned to allow reading of the entry operand from the X operational register in which the resultant operand is to be stored. Further, if the X operational register designated to receive the resultant operand contains an entry operand which has not been read, the test for store operand unit 6.60 will disable the transmit result condition 6.68 until that operational register is cleared; that is, the resultant operand has been read by the reserving functional unit.

When the above conditions have been fulfilled, the test for store operand unit 6.60 will condition the transmit result sequence allowing the functional unit 6.16 to send its resultant operand to the X operational register, via line i. Concurrently, the X operational register, which is to receive the result being transmitted by functional unit 6.16 is told to store the resultant operand. Also, the $X_i$ designator is cleared via line 6.74, the F designators are cleared via lines 6.72 and 6.37 and the Q designators of the reserving functional units are cleared via line 6.72 and 6.54.

Now that the general logical sequences of the scoreboard operation have been described, it would be well to consider an example of operation. Assume that the arithmetic section of a digital data central processor comprises four functional units capable of performing arithmetic and logical operations. From the group of functional units as set forth in FIGURES 7a and 7b, assume that the divide, boolean, add, and long add functionals and their associated $F_i$, $F_j$ and $F_k$, $O_j$ and $Q_k$ designators and read flags comprise the arithmetic section of the processor. Further, assume for purpose of example that eight operational registers, the X group, are the only operational registers. The arithmetic and logical units may comprise any known arthimetic or logical systems used in a high speed digital computer. The designators and the operational registers may comprise any register, device or means known or used in a computer to temporarily store data. All of the components used in the digital data central processor are known in the computer art. Further, the source of data including means for transmitting data in a predetermined sequence to the registers comprise means presently used and known in the computer art.

FIGURES 9a, 9b, 10 and 11 illustrate the scoreboard which is the heart of the digital data central processor. The FIGURES 9a, 9b and 9c set forth a logical arrangement which comprises the operation control portion of the scoreboard.

FIGURE 10 illustrates the X designators of the scoreboard including a chart showing reservations placed therein.

FIGURE 11 is a timing chart illustrating the relationship between issuing and execution of certain instruction of a program set forth hereinafter.

For purpose of example, assume that the following four instructions comprise a program which the digital data central processor is to execute.

1st instruction—use boolean unit:

(a) instruction 10201 (octal)
(b) instruction 10XXX indicates boolean unit, unit code from Table A is 04 (octal)
(c) $X_2 = X_0$ (log) $X_1$
(d) instruction requires 200 nanoseconds to calculate This instruction designates that the $X_2$ operational register is to receive the resultant operand and the $X_0$ and $X_1$ operational registers are to contain the entry operands. The type of logical operation to be performed is not critical.

2nd instruction—use divide unit:

(a) instruction 44412 (octal)

(b) instruction 44XXX indicates divide unit, unit code from Table A is 05 (octal)

(c) $X_4 = X_1/X_2$ (d) instruction requires 800 nanoseconds to calculate

This instruction designates that the $X_4$ operational register is to receive the resultant operand and the $X_1$ and $X_2$ operational registers are to contain the entry operands.

3rd instruction—uses add unit:

(a) instruction 30036 (octal)
(b) instruction 30XXX indicates Add unit, unit code from Table A is 17 (octal)
(c) $X_0 = X_3 + X_6$
(d) instruction requires 200 nanoseconds to calculate This instruction designates that the $X_0$ operational register is to receive the resultant operand and the $X_3$ and $X_6$ operational registers are to contain the entry operands.

4th instruction—uses long add unit:

(a) instruction 36504 (octal)
(b) instruction 36XXX indicates long add unit, unit code from Table A is 16 (octal)
(c) $X_5 = X_0 + X_4$
(d) instruction requires 400 nanoseconds to calculate This instruction designates that the $X_5$ operational register is to receive the resultant operand and the $X_0$ and $X_4$ operational registers are to contain the entry operands.

In discussing the operation of the scoreboard, reference will be made to the scoreboard logical diagram of FIGURE 8, to the operation control diagram of FIGURES 9a, 9b and 9c, to the X designators of FIGURE 10 and to the timing chart of FIGURE 11. The discussion will be centered upon operation of the scoreboard, the operational registers and the functional units based upon the above instructions. Table B hereinafter shall be used as the basic timing chart of scoreboard operation in the placing of reservation. It is further assumed that data is initially placed into the X operational registers and that the program requires the use only of this data, the use of resultant operands from other functional units or a combination thereof.

TABLE B.—INSTRUCTION CYCLES FOR CENTRAL PROCESSOR OPERATIONS

| | | |
|---|---|---|
| Skip Cycle 1 | 1a—No operation | |
| Skip Cycle 1 | 1b—No operation | |
| Skip Cycle 1 | 1c—Boolean....U¹ | |
| Skip Cycle 2 | 2a—No operation | |
| Skip Cycle 2 | 2b—Boolean....U²(U⁴) | |
| Skip Cycle 2 | 2c—Divide....U¹ | |
| Issue Boolean | 3a—Set *boolean unit* | |
| | Copy $X_0$----$Q_j=0$ | |
| | Copy $X_1$----$Q_k=0$ | |
| | Set $F_i$, $F_j$ & $F_k$ in boolean | ($X_2$, $X_0$, $X_1$) |
| | 3b—Divide....U² (U⁴) | |
| | Set $X_2$ to boolean unit | (04=boolean code) |
| | 3c—Add....U¹ | |
| Issue Divide | 4a—Set *divide* unit | |
| | Copy $X_1$----$Q_j=0$ | (0) Set Flag |
| | Copy $X_2$--$Q_k=04$ | (04) Wait Boolean |
| | Set $F_i$, $F_j$ & $F_k$ in divide | ($X_4$, $X_1$, $X_2$) |
| | 4b—Add..U² (U⁴) | |
| | Set $X_4$ to divide unit | (05) Divide Code |
| | 4c—Long add..U₁ | |
| Issue Add | 5a—Set add unit | |
| | Copy $X_3$--$Q_j=0$ | (0) Set Flag |
| | Copy $X_6$--$Q_j=0$ | (0) Set Flag |
| | Set $F_i$, $F_j$ & $F_k$ in add unit | ($X_0$, $X_3$, $X_6$) |
| | 5b—Long add....U² (U⁴) | |
| | Set $X_0$ to add unit | (17=Add code) |
| | 5c—No operation....U₁ | |
| Issue Long Add | 6a—Set *long add* unit | |
| | Copy $X_0$--$Q_j=17$ | (17) Wait Add |
| | Copy $X_4$--$Q_k=05$ | (05) Wait Divide |
| | Set $F_i$, $F_j$ & $F_k$ in long add | ($X_5$, $X_0$, $X_4$) |
| | 6b—No operation Inst..U² (U⁴) | |
| | Set $X_5$ to long add unit | (16=long add code) |
| | 6c—No operation | |

For purposes of establishing a timed relationship between the issue instructions in the example, assume that the time between the cycles, 1a to 2a for example, is 100 nanoseconds.

Considering now FIGURES 9a, 9b, 9c, 10 and 11. The main functions of the operation control are: (a) to determine if the entry operands are to comprise new operands or the resultant operand of another functional unit; (b) to determine if an entry operand of another functional unit is using the X operational register which is to receive a resultant operand. Since this example is using only the X group operational registers, all references in this example shall be to the X group operational register with the understanding that any of the other group operational registers may be used.

Figure 9A:
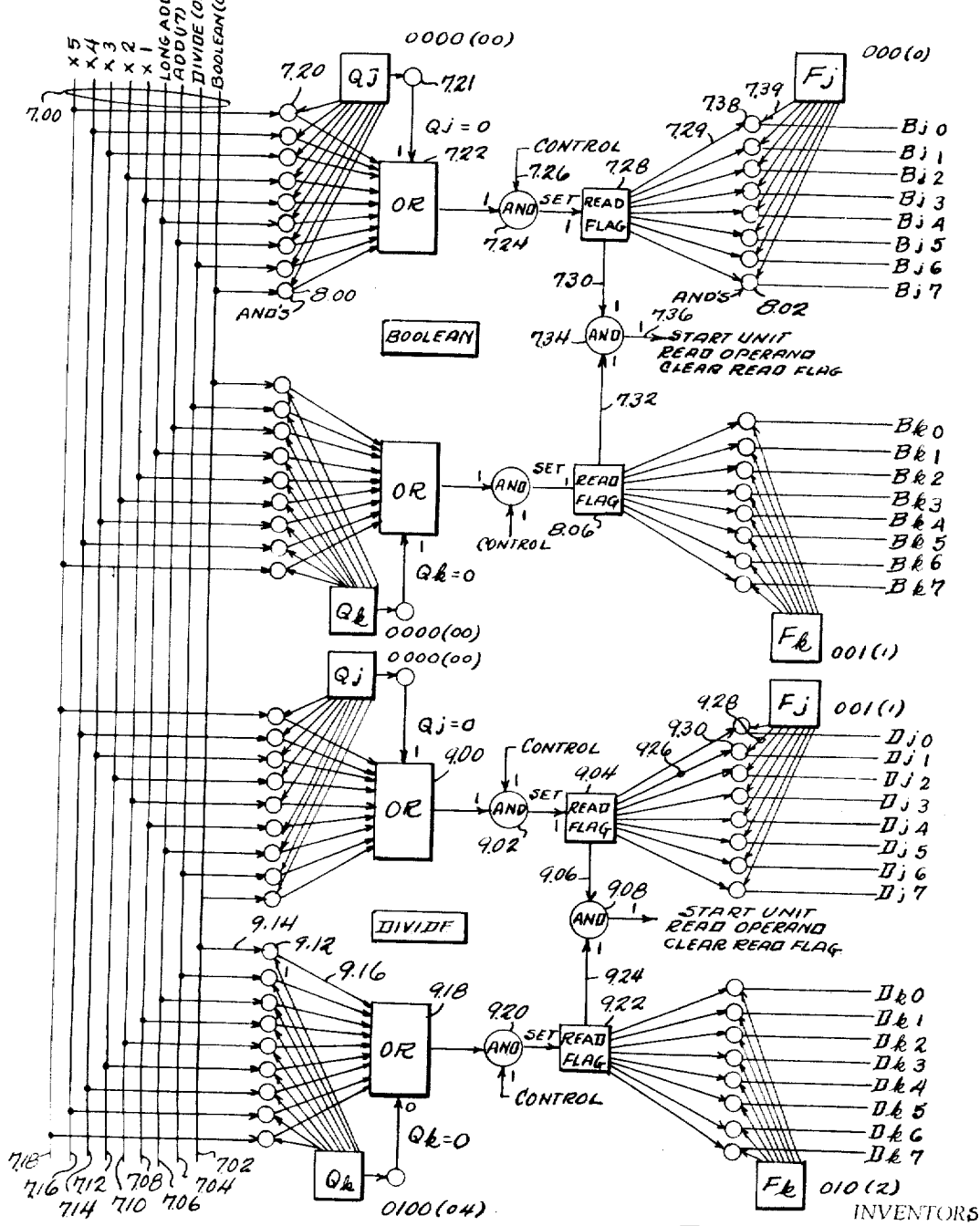
FIGURES 9a, 9b and 9c illustrate the test for store operand and test for read operand parts of the logic diagram of FIGURE 8.
Figure 9B:
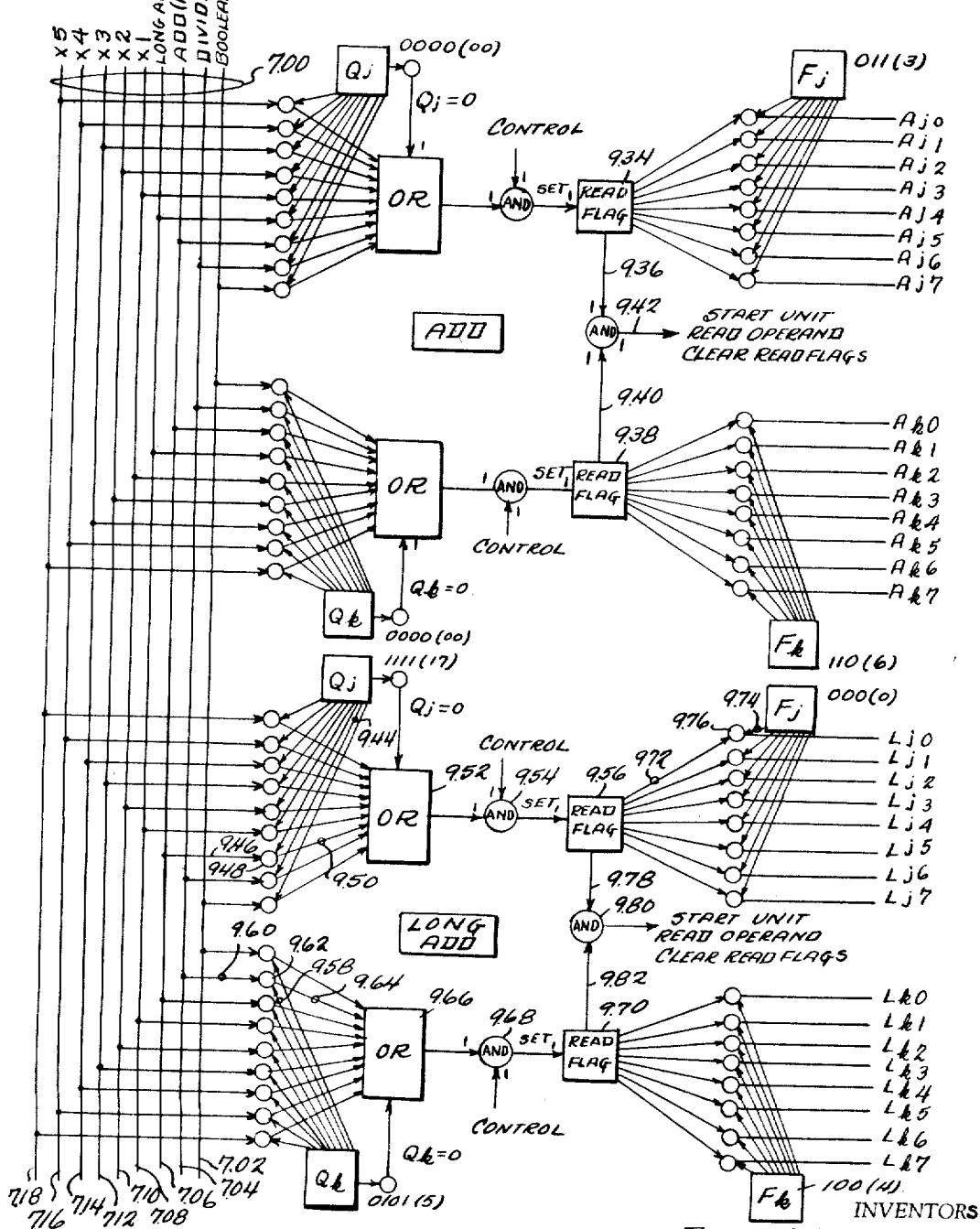

FIGURE 9b is to be positioned below FIGURE 9a in the following example. FIGURE 9c is to be disposed to the right of the FIGURES 9a and 9b combination. In FIGURES 9a and 9b, a plurality of signal requesting unit lines 7.00 are illustrated. The group of signal requesting unit lines 7.00 emanate from two sources; first, one line from each functional unit, and second, one line from the X operational registers which are capable of receiving data from a data source such as a central memory. In this example, only the $X_1$ to $X_5$ operational registers are capable of receiving data from a data source.

The signal requesting unit line for each functional unit emanates directly from the test for store operands unit 6.60 in FIGURE 8 and is shown as the signal requesting unit line 6.54. This line is used to clear or condition the reading of the entry operand from the previously reserved X operational register.

However, it is also possible that before an X operational register can be read, that it will have to be updated. It is possible for the X operational register to place a code in the Q designator which simulates a prior reservation. When the new data is received from the source of data, and when the X operational register can be read, the Q designator is conditioned to allow that entry operand to be read. Thus, a signal requesting unit line for the $X_1$ through $X_5$ operational registers are utilized similar to the signal requesting unit line from each functional unit.

In FIGURES 9a and 9b, line 7.02 is for the Boolean unit, line 7.04 for the divide unit, 7.06 for the add unit, line 7.08 for the long add unit, line 7.10 for the $X_1$ operational register, line 7.12 for the $X_2$ operational register, line 7.14 for the $X_3$ operational register, 7.16 for the $X_4$ operational register and line 7.18 for the $X_5$ operational register. Each signal requesting unit line is ANDed with the $Q_j$ and $Q_k$ designator of each functional unit. A typical example is the boolean unit $Q_j$ designator of FIGURE 9a being ANDed at gate 7.20 with the signal requesting unit line from the $X_5$ operational register. The $Q_j$ designator, when storing a prior reservation, actually contains a unit code, thus the code is translated (not shown) to select the AND gate which will be conditioned by the signal requesting unit line designated by the code. The output from each Q designator AND gate is applied to an OR gate, of which 7.22 is typical.

If the $Q_j$ designator does not contain a prior reservation, the unit code stored therein is 00. Thus if $Q_j = 00$, an AND gate, for example 7.21, will be conditioned to apply a separate input to the OR gate, for example to OR gate 7.22. The output of the OR gate is applied to an AND gate, for example, the output from OR gate 7.22 to AND gate 7.24 at the AND gate, the OR output and a control signal conditions the AND gate.

When the AND gate is conditioned, it will set a read flag of the functional unit corresponding to that entry operand. Read flag 7.28 is typical. When the read flag is set, this indicates that the functional unit can read that entry operand from the X operational register designated in its $F_j$ designator. Thereafter, the read flag will condition a read operand AND gate. For example, AND gate 7.34 being conditioned via line 7.30 from read flag 7.28. This AND gate when conditioned by both the $Q_j$ and $Q_k$ read flags, line 7.32 being the other condition on the AND gate 7.34 from the $Q_k$ read flag, will signal the functional unit to start unit to read operands, clear read flags and initiate operation of the functional unit.

At this point of the example, the test for read operands sequence of the operation control has been initiated. The remainder of FIGURE 9a, 9b and FIGURE 9c comprise the logic for the test for store operands including the granting of permission for a unit to transmit its resultant operand to its designated X operational register.

The logical operation of the test for store operand sequence requires that the X operational register designated to receive the resultant operand is not in use. Recalling the initial conditions which determine the issuance of an instruction, the unit which is to perform the calculation must be free and the operational register designated to receive the result must not be reserved for the result of another unit. Thus, it is possible for an X register to be reserved for an entry operand of another functional unit. When this condition exists, the resultant operand must be read out before the result from a functional unit can be placed therein. This condition will become apparent when the example is discussed in detail. When the above condition has been satisfied, the transmit result will condition its signal requesting unit line.

Considering now the remainder of the operation control within FIGURES 9a and 9b. If one entry operand read flag is set and the other read flag is not set for a functional unit, it is possible that another functional unit will attempt to store its result in the X operational register now containing the entry operand. The operation control will disable the transmit result until both entry operands of the functional unit having the prior reservation have been read. The read flag that is set has a plurality of outputs which are ANDed with outputs from its F designator. The F designator would contain, in binary, the X operational register containing the entry operand. Each F designator would have an output corresponding to each X operational register. Thus the output from the F designator would be on the line corresponding to the X operational register number contained within the F designator. For example, if the $F_j$ designator of the boolean unit has a 0 therein, line 7.39 would be conditioned to AND gate 7.38. The other input 7.29 to AND gate 7.38 will be from the read flag 7.28. When AND gate 7.38 is conditioned by the inputs, select line $B_{j0}$ will be conditioned. When a select line is conditioned, this indicates that a functional unit has only one of its entry operands present and is waiting for its other entry operand before it can proceed.

Figure 9C:
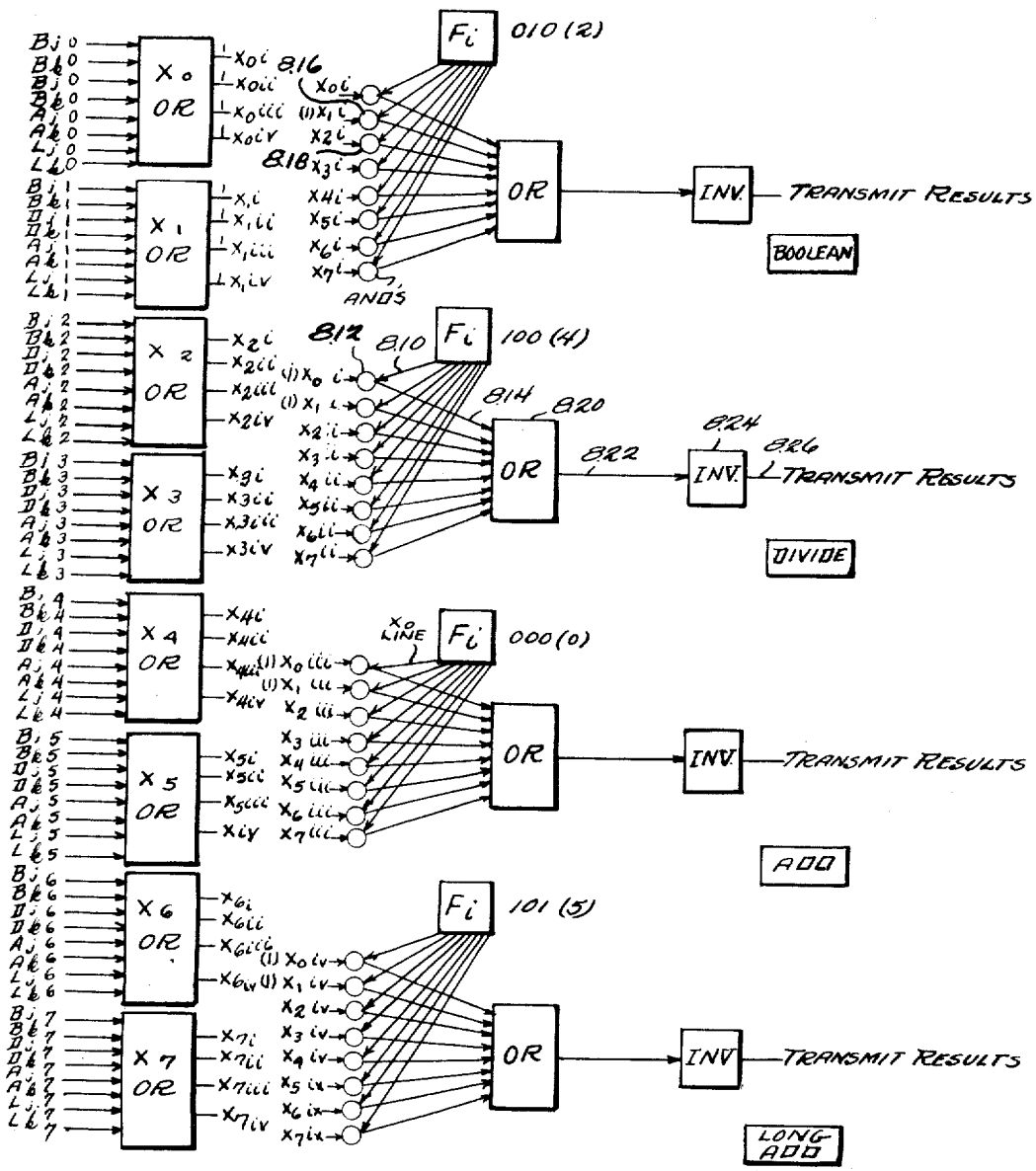

Referring now to FIGURE 9c, the select lines are applied to a plurality of register OR gates. The inputs are arranged such that the select lines from each F designator—read flag AND gate combination corresponding to each X operational register is an input to the OR gate of that register OR gate. An example of this would be the $B_{j0}$ select line being an input to the $X_0$ OR gate. If select line $B_{j7}$ of FIGURE 9a had been conditioned, this would be an input to the $X_7$ OR gate. Thus, each entry operand has eight select lines as illustrated in FIGURES 9a and 9b. The select line inputs to their respective register OR gates are shown in FIGURE 9c.

The register OR gate which has a conditioned input will have its four outputs conditioned. For example, $X_0$ OR gate will have its output $X_{oI}$, $X_{oII}$, $X_{oIII}$ and $X_{oIV}$ conditioned. The outputs from each OR gate are ANDed with outputs from the $F_l$ designator of each functional unit. $F_l$ designator has a plurality of output lines wherein each output line corresponds to the number, in binary, of the X operational register stored therein. Similar to the $F_j$ and $F_k$ designators, the $F_l$ designators condition the output line corresponding to the X operational register therein. Thus each $F_l$ designator output line is ANDed with an output from the corresponding register OR gate. An example of this would be that the $F_l$ designator of the divide unit contained $X_0$ therein and conditioned its $X_0$ line 8.10. This $X_0$ line 8.10 is applied as one input to AND gate 8.12. The other input $X_{oII}$ to AND gate 8.12 is from the register $X_0$ OR gate.

When an output from a register OR gate is ANDed with an output from the $F_l$ designator, and that AND gate is conditioned, that AND gate output is then applied to a result OR gate. When this OR gate is conditioned making its output conditioned, the conditioned OR output will be applied to an inverter. The conditioned output of the inverter is the *disabled transmit result* condition.

If the resultant OR output is conditioned, for example resultant OR gate 8.20 is conditioned by line 8.14, its output 8.22 will condition the inverter 8.24 which output will then be disabled. Since the inverter output 8.26 is the transmit result condition, the transmit result is disabled. If the result OR gate does not have any of its inputs conditioned, the OR gate will not condition the inverter. If the inverter is *not* conditioned by the OR gate, the transmit result will be conditioned.

Now that the operational control of FIGURES 9a, 9b and 9c has been described generally, a detail example of operation using the instruction of Table B will now be considered.

The first instruction is 10201 (octal) in the format of $f\ m\ i\ j\ k$. In a 15 bit binary code, the instruction would be 001000010000001. Considering the instruction 10201 (octal), this instruction would be passed from the instruction stack via line 1.80 to the $U^1$ register 5.98. Thereafter, the $U^1$ register 5.98 will pass the instruction to the $U^2$ register via line 6.00 to the translate instruction unit 6.08 via line 6.04 and to the translate unit 6.20 via line 6.06. The $U^2$ register would determine from the *i* portion of the instruction that the $X_2$ operational register is to receive the resultant operand and would check the X designator of the $X_2$ operational register to determine if that register is previously reserved for the results of another functional unit. In the instant cases, the $X_2$ register is free and not in use. Since the result register is free, result reservation line 6.28 will be "1" fulfilling the first condition for the test for issue unit 6.30. The $U^1$ register will pass the *fm* portion of the instruction via line 6.04 to the translate instruction unit 6.08. The translate unit 6.08 will translate the 10 code into a select code indicating the boolean divide unit and temporarily will store the select code in the $U^4$ register 6.12 via line 6.10. Since the boolean unit is free at this time, a "1" condition appears on the unit free line 6.32 into the test of issue unit 6.30.

The third output line 6.06 from the $U^1$ register 5.98 will apply the *fm* portion 10 to a translator 6.20 which will translate the instruction into the register group selection code and pass the translated results via line 6.22 to select flip-flop unit 6.24 for temporary storage. The select flip-flop unit 6.24 will pass the unit code 04 and selected X operational register $X_0$ and $X_1$ to the test for issue unit 6.30 via line 6.26.

The $U^1$ register passes the instruction over its three output lines 6.00, 6.04 and 6.06 simultaneously. When this has been accomplished, the instruction in the $U^1$ register is then cleared, and a second instruction is then placed into the $U^1$ register. The second instruction would be 44412, an instruction requiring the use of the divide unit.

At this point, reference to Table B discloses that the above discussion requires the use of two skip instruction cycles. The 1 skip cycle is divided in parts 1a, 1b and 1c. During parts 1a and 1b of the skip cycle, no operations will occur. The scoreboard will not begin operation until an instruction is issued to place reservations. The 1c part of the cycle is the time at which a first instruction will be passed from the instruction stack to the $U^1$ register. In order to get information into the scoreboard, a skip cycle is used. After two instructions have been entered into the scoreboard, the test of issue unit will then provide issue control making the scoreboard operation autonomous in controlling the placing of reservations. Thus the skip cycle is merely an artificial issue instruction which initiates the scoreboard operation. The second instruction skip cycle 2, including parts 2a, 2b and 2c are also under control of the skip cycle. During the 2a part of the skip cycle, the boolean instruction in the $U^1$ register is passed to the $U^2$ register and the $U^4$ register including the translate instruction unit. Hereinafter when the instruction is noted as having passed to the $U^2$ and $U^4$ register, the instruction is also considered as having passed to the translate unit, and subsequently, to the select flip-flops. At the completion of the 2b part of the skip cycle, the 2c part of the skip cycle will place the next instruction, the divide instruction, into the $U^1$ register. At the completion of the entire 2 skip cycle, the scoreboard has sufficient information allowing it to issue the first instruction.

The scoreboard test for issue unit 6.30 is properly conditioned to issue the boolean instructions. This instruction cycle is the 3rd cycle or issue boolean as shown in Table B. During the 3a part of the issue boolean cycle, the issue line 6.34 will set the boolean unit flip-flop which will disable the unit free input 6.32 to prevent issuance of a subsequent boolean instruction. However, before the test for issue unit 6.30 is disabled, the other issue output will complete their issue sequence. Issue output 6.38 will allow the copying of the unit code of a reserving functional unit stored in the X designators of the X operational registers to the Q designators of the requesting functional unit. The appropriate X operational registers for the copying operation are actually determined from the $U^2$ register 6.02. This condition is shown on FIGURE 8 as line 6.03 from the $U^2$ register 6.02 to the select flip-flop 6.24. In this instruction, none of the X operational registers have a prior result reservation. Both X operational register designators will have an octal 00 copied therefrom into the $Q_j$ and $Q_k$ designators.

The last operation to be performed during the 3a portion of the boolean cycle is to set the $F_i$, $F_j$ and $F_k$ designators. The F designator when set, will contain in binary, the number of the associated X operational registers designated by the i, j and k portion of the instruction. In the boolean instruction of 10201 the i is $X_2$, the j is $X_0$ and the k is $X_1$.

The 3b part of the boolean cycle performs the operations of passing the divide instruction 44412 from the $U^1$ register 5.98 to the $U^2$ register and $U^4$ registers and of setting the $X_i$ operational register designator with the unit code of the requesting functional unit. Since the instruction is a boolean, the unit code of 04 (octal) will be placed in the $X_2$ designator.

The 3c part of the boolean cycle then replaces the divide instruction in the $U^1$ register with a third instruction from the instruction stack. This instruction is an add instruction 30036 (octal).

Referring now to FIGURES 9a, 9b and 9c which contain the placed reservations for the boolean instruction. The Q designators are a four binary bit register. The F designators are a three binary bit register. The read flag is a one bit binary register. The X designator is a four binary bit register. The $Q_j$ and $Q_k$ of the boolean unit would have binary 0000 (octal 00) stored therein. The $F_i$ would have a binary 010 (octal $X_2$), the $F_j$ would have a binary 000 (octal 0) and $F_k$ would have a binary 001 (octal 1) stored therein.

If a unit code was present in the $Q_j$ designator, that unit code would be translated and the proper AND gate would be conditioned corresponding to that unit code. Since $Q_j$ is 0, the OR gate 7.22 will be conditioned by the $Q_j$ designator via AND gate 7.21. AND gate 7.21 will apply a 1 input to OR gate 722 when Q=00. Similarly, $Q_k$ is 00 and its OR gate will have a 1 input.

The OR gate 7.22 will apply a 1 to AND gate 7.24, which when conditioned by control 7.26, will apply a 1 to set read flag 7.28. When read flag 7.28 is set, a 1 will be applied to the AND gate 7.34 via line 7.30. The read flag 7.28 will apply its output to a plurality of AND gates of which AND gate 7.38 is typical. The other input into the AND gates emanates from the $F_j$ designators. The $F_j$ designators contains the number of the X operational register which contains the entry operand $X_j$. Thus, the appropriate AND gate will be conditioned according to the number stored in the designator $F_j$. For example, if $F_j$ is a 0, AND gate 7.38 will be conditioned with a 1. If $F_j$ was an 111 (octal 7), AND gate 8.02 would have been conditioned. Thus, AND gate 7.38 is conditioned passing a 1 on select line $B_{jo}$. All the other output lines from the AND gate of the read flag and $F_j$ output combinations are 0.

Simultaneously, the read flag 8.06 associated with the $Q_k$ designator would be set applying a 1 to AND gate 7.34. AND gate 7.34 would then be conditioned by lines 7.30 and 7.32 telling the boolean unit to start, read its entry operands from $X_0$ and $X_1$ operational registers and to clear read flags 7.28 and 8.06. Further, select line $B_{k1}$ would be a 1 since $F_k$ is 001 (octal 1). The fact that $B_{jo}$ and $B_{k1}$ had a 1 thereon would not affect operation control because both read flags were set and cleared simultaneously.

FIGURE 10 shows the X operational designators. When the boolean instruction is placed, designators $X_2$, $X_0$ and $X_1$ are subject to certain operations. The contents of the $X_0$ and $X_1$ designators were copied into the $Q_j$ and $Q_k$ designators of the boolean unit. This copying sequence is illustrated by the C in FIGURE 10 under the boolean cycle. The $X_2$ designator had the boolean unit code 0100 (octal 4) stored therein also shown in FIGURE 10 under the boolean cycle.

FIGURE 11 is a chart illustrating the relationship between the functional units, the instruction issue times and the unit start and completion times. Recalling that the time between cycles is 100 nanoseconds, the time 100 and 200 on the chart are the 1 and 2 skip cycles shown on table B. At the third cycle, the boolean instruction is issued. Since the entry operands were both available, the boolean unit began its operation immediately in the 3rd or boolean cycle. Since the boolean instruction takes 200 nanoseconds to operate, it will have its result ready to transmit at the 5th cycle shown as time 500. Between the times of 300 and 500 nanoseconds, only the $X_2$ designator will have the boolean unit code of 0100 therein.

The test for issue unit is ready to issue the divide instruction 44412 (octal) if the divide unit is free and if its result register ($X_4$) is not reserved for the results of another functional unit. During the 3b part of the boolean cycle, the divide instruction was passed to the $U^2$ and $U^4$ registers. The test for issue unit would be conditioned to issue the instruction by the unit free and by the result reservation as determined by the $U^2$ and $U^4$ register tests. The divide unit is free because its busy flip-flop is not set. Further, the instruction designated that the $X_4$ operational register is to receive the resultant operand. Since the $X_4$ operational register is not reserved for the results of the boolean unit, the register is not reserved for the result of any functional unit.

The test for issue unit being properly conditioned will issue the divide instruction 44412 (octal). This will be the 4th or divide cycle. On the chart of FIGURE 11, the divide instruction is issued at time 400. The divide instruction designates that the entry operands j and k are to be read from the $X_1$ and $X_2$ operational registers respectively. The code presently within the $X_4$ designator is a 000 (octal 0) since this register is not reserved for the results of another functional unit. When contents of the $X_1$ designator are copied into the $Q_j$ designator of the divide unit, the $Q_j$ designator will have 0000 therein and will set its read flag. However, then the contents of the $X_2$ designator are copied into the $Q_k$ designator of the divide unit, the $Q_k$ designator will have a 0100 (octal 4) stored therein which is the boolean unit code. Since the $Q_k$ has a prior reservation stored therein, its read flag will not be set.

Thereafter, the copying sequence is followed by the setting of the $F_i$, $F_j$ and $F_k$ designators of the divide unit. The $F_i$ will be set to 100 (octal 4), the $F_j$ will be set to 001 (octal 1) and the $F_k$ will be set to 010 (octal 2).

In the 4b part of the divide cycle, the add instruction 30036 (octal) will be passed from the $U^1$ register to the $U^2$ and $U^4$ register in preparation for its issue. Also, the $X_4$ designator will be set to the divide unit code of 0101 (octal 5).

During the 4c part of the boolean cycle, the fourth instruction, a long add 36504 (octal) is passed from the instruction stack into the $U^1$ register.

Referring now to the divide unit FIGURE 9a, the $Q_j$ designator wil have a 0000 (octal 00) stored therein. The $Q_j=0$ line will be conditioned applying a 1 to the OR gate 9.00. The OR gate 9.00 will be conditioned applying a 1 to AND gate 9.02. The other condition into AND gate 9.02 is the control which will be a 1. Thus AND gate 9.02 will be conditioned by both inputs and will pass a 1 setting the read flag 9.04. Output 9.06 from the read flag 9.04 will be applied to AND gate 9.08. AND gate 9.08 must be conditioned by both inputs 9.06 and 9.24 before it will allow the unit to start and complete its operation.

Considering now the $Q_k$ designator, $Q_k$ designator will have a 0100 (octal 4) stored therein. Since 0100 is the unit code for the boolean unit, the unit code will be translated and the output line 9.10 will be selected and conditioned with a 1. Line 9.10 will apply the 1 to AND gate 9.12. The other input to AND gate 9.12 is from the boolean unit signal requesting unit line 7.02 via line 9.14. Recalling that the boolean signal unit requesting line 7.02 will be conditioned only when the boolean unit is permitted to transmit and store its results, the line 7.02 will apply a 0 to AND gate 9.12. Therefore, AND gate 9.12 will not be conditioned and line 9.16 will apply a 0 input to OR gate 9.18. Similarly, every other input to OR gate 9.18 will be a 0 causing the OR gate to apply a 0 to AND gate 9.20. The AND gate 9.20 will be disabled by OR gate 9.18 and will not set read flag 9.22. The outputs from the read flag 9.22 will be a 0 including line 9.24. Line 9.24 then disables AND gate 9.08. This condition will remain until the boolean unit conditions AND gate 9.12.

Summarizing, the $Q_j$ of the divide unit does not contain a prior reservation and has conditioned AND gate 9.08 via line 9.06 indicating that the $j$ entry operand can be read from the $X_4$ operational register. However, $Q_k$ designator contains a prior reservation and has disabled AND gate 9.08 via line 9.24 indicating that the $k$ entry operand cannot be read from the $X_2$ operational register until the boolean unit stores its result therein.

When the above condition occurs, a checking sequence is initiated to disable any functional unit from transmitting its resultant operand to the $X_1$ operational register.

The read flag 9.04 would apply a 1 to all its outputs including line 9.26. The $F_j$ designator contains a 001 (octal 1) and will condition its output 9.28 with a 1. Both outputs 9.26 and 9.28 are inputs to AND gate 9.30. AND gate 9.30 would be conditioned passing a 1 on select line $D_{j1}$. Passing now to FIGURE 9c, select line $D_{j1}$ is an input to the $X_1$ register OR gate $X_1$ register OR gate will condition its four outputs $X_{1i}$, $X_{1ii}$, $X_{1iii}$, and $X_{1iv}$ with a 1. One output line goes to an AND gate for ANDing with an output line corresponding to its register from each $F_i$ designator. In the instant case, the boolean $F_i$ is 010 (octal 2) and the divide $F_i$ is as an 100 (octal 4). The $F_i$ of the other functional units is 000 (octal 0). It is apparent that none of the $X_1$ registers or outputs can be ANDed with any $F_i$ designator outputs since none of the $F_i$ designators designate the $X_1$ operational register to receive a result.

FIGURE 10 illustrates that the $X_2$ designator has a 0100 (octal 4) stored therein. The C indicates that the contents of $X_2$ designators was copied into $Q_k$ designator. This illustrates that the resultant operand of the boolean calculation is to be an entry operand for the divide unit.

FIGURE 11 illustrates that the divide instruction is issued at time 400. However, due to the inavailability of one entry operand, the divide cannot start its calculation. Since the boolean unit is the cause of the entry operand not being available, the divide unit is disabled until time 500 when the boolean unit has completed and stored its result.

The test for issue unit is now ready to allow issuance of the add instruction 30036 in the 5th or add cycle. The add unit is free and the X operational register designated to receive the results is not reserved for the results of another functional unit.

However, before considering the detail operation of the add unit, the boolean unit will complete its calculation and store its result at time 500. In FIGURE 9c, the transmit result is properly conditioned to allow the boolean unit to store its result. This is verified by the fact that none of the AND gates between the $F_i$ register and OR gate combination are conditioned. Thus when the boolean unit requests release of its result (line 6.62 in FIGURE 8), the transmit result of the boolean unit will permit the resultant operand to be stored in the $X_2$ operational register. The other functions performed while the result is being transmitted to the operational registers are the clearing of the X designator, the command for the $X_2$ operational register to store the resultant operand, the clearing of the F designators and the clearing of the Q designators via the signal requesting unit line. In FIGURE 9a and FIGURE 9b, line 7.02 is the boolean unit signal requesting unit line. In FIGURE 9a, line 7.02 will be conditioned with a 1 by the test for store operand unit 6.60. Line 7.02 via line 9.14 will apply a 1 to AND gate 9.12 of the divide unit. AND gate 9.12 will be conditioned since line 9.10 was conditioned previously by the $Q_k$ designator. AND gate 9.12 will apply a 1 via line 9.16 to OR gate 9.18 causing the OR gate to apply a 1 input to AND gate 9.20. When AND gate 9.20 is conditioned by the control, read flag 9.22 will be set applying a 1 to AND gate 9.08. As previously stated, the other input 9.06 to AND gate 9.08 is conditioned with a 1 from the read flag 9.04. Thus when the AND gate 9.08 is conditioned by both inputs 9.06 and 9.24, this indicates that both read flags are set and that both entry operands are available and can be read. Thus AND gate 9.08 will allow the divide unit to start, will allow the unit to read its entry operands from the $X_1$ and $X_2$ operational registers, and will clear both read flags 9.04 and 9.22. FIGURE 11 illustrates that the divide unit begins its operation at time 500, that the unit will take 800 nanoseconds to operate and that the operation will be completed at time 1300. At that time, the divide unit will store its resultant operand in the $X_4$ operational register.

Refer again to the add instruction 30036 (octal) which is concurrently being issued at time 500. This will be the 5th or add cycle. During the 5a part of the add cycle, the add unit flip-flop will be set. The add instruction designates that the entry operands $j$ and $k$ are to be read from the $X_3$ and $X_6$ operational registers respectively. The code within the $X_3$ designator is a 0000 (octal 0) since the register is not reserved by a prior functional unit. Similarly, the code within the $X_6$ designator is a 0000 (octal 0) and will set their read flags. Thereafter, prior functional unit. When the contents of the $X_3$ and $X_6$ designators are copied into the $Q_j$ and $Q_k$ designators respectively, both the $Q_j$ and $Q_k$ designator will store a 0000 (octal 0) and will set their read flags. Thereafter, the $F_i$, $F_j$ and $F_k$ designators of the add unit will be set. The $F_i$ designator will have a 000 (octal 0), the $F_j$ designator will have a 011 (octal 3), and the $F_k$ designator will have a 110 (octal 6).

In the 5b part of the add cycle, the long add instruction 36504 (octal) will be passed from the U¹ register to the U² and U⁴ registers in preparation for its issue. Further, the $X_0$ designator, will be set to the add unit code of 1111 (octal 17).

During the 5c part of the add cycle, there will be no operation of passing an instruction from the instruction stack into the U¹ register since the program repertoire was limited, for purposes of example, to four instructions.

In FIGURE 9b, the $Q_j$ and $Q_k$ designators of the add unit would have 0000 (octal 0) stored therein. $F_j$ would have 011 (octal 3) and $F_k$ would have 110 (octal 6) stored therein. Both read flags will be set. Read flag 9.34 will apply a 1 via line 9.36 to AND gate 9.42. Read flag 9.38 will apply a 1 via line 9.40 to AND gate 9.42. Thus AND gate 9.42 will be conditioned by both of its inputs 9.36 and 9.40 telling the add unit to start, read its operands from the $X_3$ and $X_6$ operational registers, and will clear its read flags 9.34 and 9.38.

FIGURE 10 illustrates that during the add cycle, the $X_0$ designator has a 1111 (octal 17) add unit code stored therein. The add cycle and divide cycle can operate concurrently, since each unit has its entry operands available.

In FIGURE 11, the add instruction is shown issuing and starting at time 500. The add instruction is shown to take 200 nanoseconds and will be completed and its resultant operand stored at time 700. Between times 500 and 700, both the divide unit and add unit are operating concurrently.

The test for issue unit is ready to issue the long add instruction 36504 (octal) if the long add unit is free and if its result register is not reserved for the results of another functional unit. Recalling that during the 5b part of the add cycle, the long add instruction was passed to the U² and U⁴ register, and their associated logic would determine that the long add unit is free and that the $X_5$ operational register, which is to receive the resultant operand, is not reserved for the result of another functional unit.

The test for issue unit being properly conditioned will issue the long add instruction 36504 (octal). This will be the 6th or long add cycle. During the 6a part of the long add cycle, the long add flip-flop will be set. Further, the long add instruction designates that the entry operands j and k are to be read from the $X_0$ and $X_4$ operational registers respectively. The $X_0$ operational register is reserved by the add unit to receive its resultant operand. Thus the $X_0$ designator has a code of 1111 (octal 17) stored therein. The $X_4$ operational register is reserved for the resultant operand of the divide unit, and the $X_4$ designator has the divide code of 0101 (octal 5) stored therein. Therefore, the contents of the $X_0$ designator 1111 (octal 17) is copied into the $Q_j$ designator of the long add unit. Since each entry operand has a prior reservation, neither read flag will be set.

The $F_i$, $F_j$ and $F_k$ designators of the long add unit are set. The $F_i$ designator will have 101 (octal 5), the $F_j$ designator will have 000 (octal 0) and $F_k$ designator will have 100 (octal 4) stored therein In the 6b part of the cycle, there will be no operation of passing an instruction from the U¹ register to U² and U⁴ since an instruction was not in the U¹ register. Further, the $X_5$ designator will be set to the long add unit code of 1110 (octal 16).

In the 6c part of the long add cycle, there will not be any operation since the program was limited to four instructions.

Considering now FIGURE 9b, the $Q_j$ designator of the long add unit has 1111 (octal 17) stored therein. The $Q_j$ designator contents would be translated and line 9.44 corresponding to the add unit would have a 1 applied thereon. Line 9.44 would apply the 1 to AND gate 9.48. A second input to AND gate 9.48 is from the signal requesting unit line 7.06 via line 9.46. Since the add unit is in operation, the signal requesting unit line 7.06 will apply a 0 disabling AND gate 9.48 via line 9.46. It is apparent that all the inputs to the OR gate 9.52 are 0 causing a 0 to be applied to AND gate 9.54. AND gate 9.54 would apply a 0 to read flag 9.56. The read flag outputs will all be 0 disabling all the AND gates between the $F_j$ designator outputs and read flag outputs. All the select line $L_{j0}$ to $L_{j7}$ are 0.

The $Q_k$ designator of the long add unit has 0101 (05) stored therein. The $Q_k$ designator contents would be translated and line 9.58 corresponding to the divide unit would have 1 applied thereon. Line 9.58 would apply the 1 to AND gate 9.62. A second input to AND gate 9.62 is from the signal requesting unit line 7.04 via line 9.60. It is apparent that all the inputs to the OR gate 9.66 are 0 causing a 0 to be applied to AND gate 9.68. AND gate 9.68 will apply a 0 to read flag 9.70. The read flag outputs will all be a 0 disabling all the AND gates between the $F_k$ designators and read flag outputs. All the select lines $L_{k0}$ to $L_{k1}$ are 0.

The long add functional unit will remain in this condition until one of the two entry operands is conditioned via a Q designator. However, the long add unit must wait until both read flags are set allowing the functional unit to read both entry operands.

FIGURE 10 shows the unit code stored within the $X_5$ designator. In FIGURE 11 at time 600, the divide unit and the add unit are operating concurrently as shown in FIGURE 10 and have reservations placed to use the results of both functional units as entry operands. As illustrated, the $X_0$ operational register is reserved for the results of the add unit and the $X_4$ operational register is reserved for the results of the divide unit. In FIGURE 11 at time 700, the $X_4$ operational register is reserved for the results of divide unit and is further reserved for use as an entry operand of the long add unit. Also, at time 700, the add unit completes its operation, stores its resultant operand in the $X_0$ operational register, and conditions the $Q_j$ of the long add unit.

Among its other housekeeping operations such as transmit result, clear X designator etc., the signal requesting unit line 7.06 of FIGURE 9b will be conditioned with a 1 to condition the $Q_j$ designator. The 1 will be applied to AND gate 9.48 via line 9.46. As discussed previously, input 9.44 is a 1. Since both inputs 9.44 and 9.46 are 1, and gate 9.48 will be conditioned applying a 1 to line 9.50. Line 9.50 applies a 1 input to OR gate 9.52 resulting in a 1 input to AND gate 9.54. AND gate 9.54 will apply a 1 to the read flag 9.56 causing it to set. Read flag 9.56 will apply a 1 to all of its outputs including lines 9.72 and 9.78. The $F_j$ designator has 000 (octal 0) stored thereon and will apply a 1 to output line 9.74 which corresponds to the operational register number stored in the $F_j$ designator. Output line 9.74 is an input to AND gate 9.76 while read flag output 9.72 is the other input to AND gate 9.76. Since both inputs 9.72 and 9.74 condition AND gate 9.76, a 1 will be applied to select line $L_{j0}$. Output 9.78 is an input to AND gate 9.80 which AND gate controls the unit operation. However, the other input 9.82 is a 0 disabling AND gate 9.80, thereby disabling operation because the k entry operand is not available. In FIGURE 9c, select line $L_{j0}$ is an input to the $X_0$ register OR gate. Since input $L_{j0}$ is a 1, the outputs $X_{oi}$, $X_{oii}$, $X_{oiii}$, and $X_{oiv}$ from the $X_0$ OR gate are 1. Each of the register OR gates outputs are inputs to AND gate for ANDing the register OR gate outputs with the outputs from the $F_i$ designator which corresponds to the $X_0$ operational registers. Since none of the $F_i$ designators require that the $X_0$ operational register receive a result, none of the AND gates will be conditioned. The above operation would take place at time 700, the time at which the add unit released the $X_0$ operational register.

The long add unit must now wait until the divide unit has completed its operation to read its $k$ entry operand from the $X_4$ operational register. In FIGURE 11, the divide unit is to complete its operation at time 1300. Thus the long add unit must wait from time 700 to time 1300 before the $Q_k$ designator is conditioned by the divide unit releasing the $X_4$ operational register.

When the divide unit completes its operation at time 1300, the divide unit, along with its other housekeeping operations, will condition signal requesting unit line 7.04, FIGURE 9b with a 1. Line 7.04 will condition AND gate 9.62 with a 1 via line 9.60. As discussed hereinbefore, line 9.58 is conditioned with a 1 from the $Q_k$ designator. Since both inputs 9.58 and 9.60 are a 1, AND gate 9.62 will be conditioned applying a 1 to line 9.64. Line 9.64 will apply a 1 input to OR gate 9.66 resulting in a 1 input to AND gate 9.68. AND gate 9.68 will apply a 1 to the read flag 9.70 causing it to set. Read flag 9.70 will set and apply a 1 to all its outputs including line 9.82 which is an input to AND gate 9.80. The other input 9.78 to AND gate 9.80 is a 1 as discussed previously. Since both inputs 9.78 and 9.82 into AND gate are 1, this indicates that both the $j$ and $k$ entry operands are available in the $X_0$ and $X_4$ registers respectively following the long add unit to start, read operands and clear read flags.

In FIGURE 11, the time the above long add unit starts is time 1300 or the time at which the divide unit releases its entry operands and stores its result. The long add unit takes 400 nanoseconds to operate and will complete its operations at time 1700. At time 1700, the resultant operand from the long add unit will be stored in the $X_5$ operational register and the program repertoire will be completed.

Referring to Table A hereinbefore, read memory channel $X_1$ to $X_5$ are assigned code numbers. The memory channels are assigned code numbers which may be placed into a Q designator of a functional unit to place a reservation that an operand is to come from memory. In the above discussion, it was assumed that the data was initially placed into the X operational registers and that the entry operands were to comprise the initial data, resultant operands from other functional units, or a combination thereof. If however, the entry operand is to be new data, the code for a memory channel is placed in the Q designator as a reservation. When the data is placed into the appropriate $X_1$ to $X_5$ operational register, the signal requesting unit line to the functional units from the X operational register will condition or clear a Q designator allowing the appropriate read flag to be set.

Now that the logical operation of the digital data central processor has been discussed in detail, consideration shall be given to basic electronic circuits and including electronic diagrams of a typical embodiment covering the set F, set Q and set X–B–A operational registers.

The electronic circuits of the central processor include several basic transistor circuits. These are the basic circuits illustrated in FIGURE 12, the AND circuit illustrated in FIGURE 13, the OR circuit illustrated in FIGURE 14, the flip-flop illustrated in FIGURE 15 and a chart for the flip-flop FIGURE 16.

Considering now the basic transistor circuit of FIGURE 12, the basic circuit is a single NPN transistor 9.20 having a collector 9.22, a base 9.24 and an emitter 9.26. The transistor 9.20 is connected as a grounded emitter amplifier circuit with its emitter 9.26 connected to a ground 9.27. The base 9.24 is connected to one end of a base resistance 9.30. An input 9.28 is connected to the other end of base resistance 9.30. The collector 9.22 is connected to one end of a collector resistance 9.34. The other end of collector resistance 9.34 is connected to a voltage supply of +V volts at point 9.32. An output 9.38 is also connected to the collector 9.22 at point 9.36.

A typical transistor selected for use in the basic circuit would have characteristics similar to those set forth in Table C hereinbelow. The +V voltage supply is 6 volts.

The minimum voltage which could be applied to the base 9.28 and still retain the transistor 9.20 in conduction is +.8 v. If a voltage below +.8 v. is applied to the base 9.28, virtually no conduction will occur in the transistor 9.20. Thus, for an illustrative example of circuit operation, two signal levels may be selected: a +.2 v. applied to the input 9.28 would drive the transistor into cutoff to provide no conduction of transistor 9.20; a +1.2 v. applied to the input 9.28 would drive the transistor into saturation to provide for maximum conduction of transistor 9.20. A practical reason for selecting these voltage signal levels is that the circuit can reject noise signals of up to +.5 v.

TABLE C.—TYPICAL OPERATING CHARACTERISTIC OF TRANSISTOR

| State | $V_B$ | $V_C$ | $I_B$ | $I_C$ |
|---|---|---|---|---|
| Cutoff | .2 v | 1.2 v | 0 | 0. |
| Saturation | .8 v | .2 v | 1 ma | 10 ma. |

Average switching time, five nanoseconds.

The operation of the transistor amplifier may be understood by assuming that a +1.2 v. input signal is applied to input 9.28. Input 9.28 via base resistance 9.30 would apply the +1.2 v. to the base 9.24. If a voltage of +1.2 v. is applied to the base 9.24, the transistor 9.20 is driven into saturation and thus conducts heavily. The voltage appearing across the collector 9.22 and the emitter 9.26 will subsequently be +.2 v., which voltage is the drop across the transistor. Further, since output 9.38 is connected to the collector 9.22 at point 9.36, the output voltage will be +.2 v.

If a subsequent input voltage of +.2 v. is applied to input 9.28, the +.2 v. would drive the base 9.26 to a +.2 v. from the +1.2 v. thus driving the transistor 9.20 into cutoff. The switching time required for the transistor to switch from saturation to cutoff would be approximately five nanoseconds. Since the transistor 9.20 is no longer able to conduct, the collector 9.22 would begin to approach the +6 volts supply voltage which would also tend to raise the output 9.38 to the supply voltage level.

However, the output 9.38, and subsequently, the collector 9.22 would be held at a +1.2 v. by other transistor amplifiers to which the output 9.38 would be connected. Also, it is possible for a single collector resistance to have up to six collectors connected to it for operation.

The inherent 180° phase shift of the transistor provides a characteristic which can have a logical connotation associated with it. For example, if the input to the circuit is denoted as A, the output from the basic circuit would be $\overline{A}$. Thus the transistor provides a basic inversion or NOT function.

The basic transistor circuits can be combined to form AND and OR circuits. Consider the basic AND circuit of FIGURE 13. The AND circuit has three NPN transistors, 9.40, 9.60 and 9.80. Transistor 9.40 has a collector 9.42, a base 9.44 and an emitter 9.46 and is connected as a grounded emitter amplifier with emitter 9.46 connected to ground 9.47. Base 9.44 is connected to one end of a base resistance 9.50. The other end of resistance 9.50 is connected to an input 9.48. The collector 9.42 is connected to one end of a collector resistance 9.52. The other end of resistance 9.52 is connected to a +V voltage source at point 9.54. Transistor 9.60 has a collector 9.62, a base 9.64 and an emitter 9.66 and is connected as a grounded emitter amplifier with emitter 9.66 connected to ground 9.67. Base 9.64 is connected to one end of a base resistance 9.70. The other end of resistance 9.70 is connected to an input 9.68. The collector 9.62 of transistor 9.60 is connected to a common collector line 9.56 at point 9.72. Common collector line 9.56 is subsequently connected to collector 9.42 of transistor 9.40. Thus common connecting line 9.56 connects the collectors 9.42 and collector 9.62 to a common collector resistance 9.52. The output from the common collecting line 9.56 is connected to another basic amplifier which includes transistor 9.80. Transistor 9.80 has a collector 9.82, a base 9.84 and an emitter 9.86 and is connected as a grounded emitter amplifier with emitter 9.86 connected to ground 9.87. The base 9.84 is connected to one end of a base resistance 9.74. The other end of the base resistance 9.74 is connected to the common collector line 9.56 at point 9.72. The collector 9.82 is connected to one end of a collector resistance 9.92. The other end of resistance 9.92 is connected to a +V voltage source at point 9.94.

The circuit of FIGURE 13 is such that if the input voltages are .2 v., the output of the AND circuit will be a .2 v. The .2 v. inputs would be applied to input 9.48 of transistor 9.40 and to input 9.68 of transistor 9.60. The .2 v. input at 9.48 would be applied to base 9.44 via base resistance 9.50. The .2 v. on base 9.44 would drive the transistor into cutoff causing collector 9.42 to attempt rising to the +V voltage of the voltage source +V. The final output voltage of collector 9.42 is also dependent upon the output voltage of collector 9.62 as will be described. The .2 v. input applied to input 9.68 of transistor 9.60 will be applied to base 9.64 via base resistance 9.70. The .2 v. on the base 9.64 will drive transistor 9.60 into cutoff causing the collector 9.62 to attempt to rise to the +V voltage of the voltage source +V. Referring to the common collector line 9.56, since both collectors are attempting to rise to the +V voltage, line 9.56 will also be driven toward the +V voltage. However, the collector output will be stabilized at +1.2 v. by transistor 9.80. Thus looking specifically at point 9.72, the voltage on line 9.56 is applied via base resistance 9.74 to base 9.84 of transistor 9.80. The voltage, which is approximately +1.2 v., on point 9.72 will drive transistor 9.80 into saturation causing the collector 9.82 to be held at +.2 v. Output 9.98, which is connected to collector 9.82 at point 9.96, is also at a +.2 v.

Again, logical connotations can be applied to the basic circuits. Assume that the inputs into the AND gate are A and B respectively. The A and B would be inverted by its respective transistor and appear as $\bar{A}$ and $\bar{B}$ outputs. These outputs are combined $\bar{A}+\bar{B}$ outputs. These outputs are combined $\bar{A}+\bar{B}=\overline{(AB)}$ as the output of the first pair of transistors. Thereafter, the $\overline{(AB)}$ is applied to a single transistor which produces $\overline{\overline{(AB)}}=$, the desired output signal. The combining of $\overline{\bar{A}+\bar{B}}=(AB)$ is well known as NOR logic.

Referring again to the AND circuit, if input 9.48 is at +1.2 v. and input 9.68 is at +.2 v., the collectors 9.42 and 9.62 would both be held at a +.2 v. because of transistor 9.40 conducting. Thus point 9.72 would be at a .2 v. The .2 v. at point 9.72 would be applied via base resistance 9.74 to base 9.84. Thereafter, if base 9.84 is a +.2 v. transistor 9.80 will be driven into cutoff which subsequently applies a +1.2 v. to the output 9.98. Similarly, the output 9.98 would be a +1.2 v. for the other combinations including input 9.48 being +.2 v. with input 9.68 being +1.2 v. and both inputs 9.48 and 9.68 being +1.2 v.

FIGURE 14 is an electrical schematic of an OR circuit which includes four basic transistor circuits. The electronic operation of the circuit may be traced utilizing the approach discussed in both the basic circuit and the AND circuit. Thus, the operation of the OR may be described by considering logical operations rather than electronic operations. The basic transistor circuits are identified as TR5, TR6, TR7 and TR8. The assumption is made that the input into the TR5 circuit is A and the input into the TR6 circuit is B. Each circuit is separate and independent and merely produces the inversion of its inputs. Thus the output of TR5 is $\bar{A}$ and the output of TR6 is $\bar{B}$. Thereafter, the outputs are applied as inputs to TR7 and TR8.

The output of TR5, $\bar{A}$, is applied to TR7 and the output of TR6, $\bar{B}$, is applied to TR8. The collectors of TR7 and TR8 are connected together and have a common collector resistance. Thus the output from the combined collectors is $A+B$. The overall OR circuit logically is $A+B$ and the logic of the TR7 and TR8 in combination is $$\overline{\bar{A}.\bar{B}}=\bar{\bar{A}}+\bar{\bar{B}}=A+B$$

Figures 15, 16:
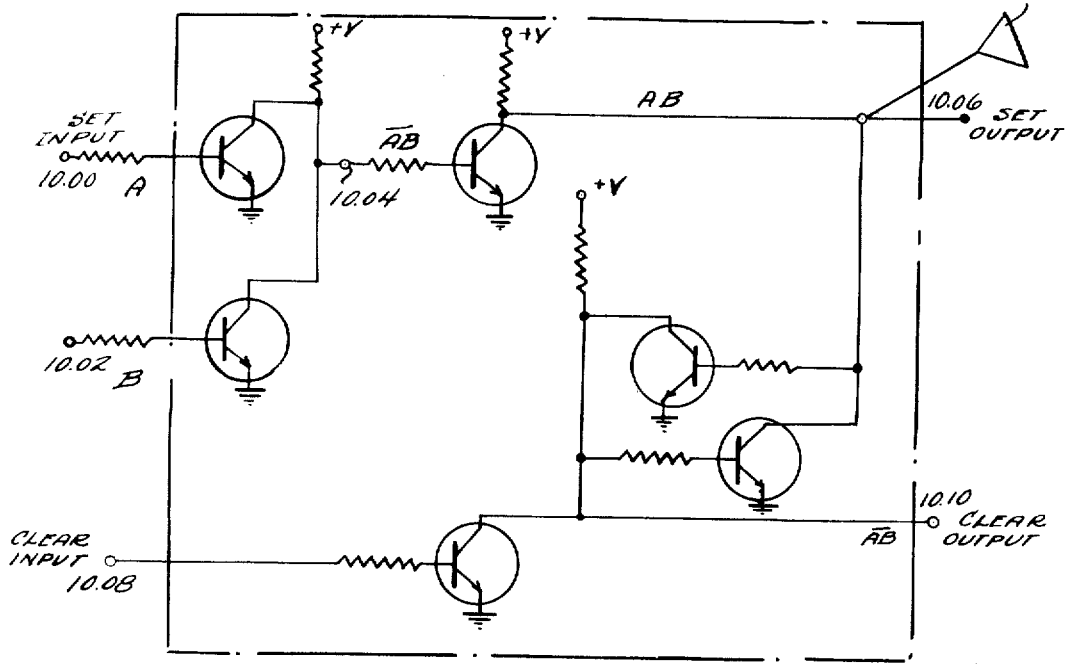
FIGURE 15 illustrates a typical flip-flop utilizing the transistor amplifier of FIGURE 12.
FIGURE 16 is a chart illustrating the typical voltage levels of the flip-flop of FIGURE 15.

FIGURE 15 is a schematic of a transistor flip-flop. The input into the flip-flop comprises two basic transistor circuits for combining input signals. The remainder of the flip-flop comprises four basic transistor circuits connected to insure bilevel operation. The flip-flop has two set inputs 10.00 and 10.02, a set output 10.06, a clear input 10.08 and a clear output 10.10. The chart of FIGURE 16 illustrating the voltage combination possible with the flip-flop. Generally, both the set inputs 10.00 and 10.02 must have a +.2 v. to set the flip-flop. All other combinations do not set the flip-flop, but keep it clear. When the flip-flop is set, the set output 10.06 is +.2 v., the clear input 10.08 is +.2 v. and the clear output 10.10 is +1.2 v. To clear the flip-flop, a +1.2 v. is applied to the clear input 10.08. When the flip-flop is clear, the set output 10.06 is +1.2 v., the clear input 10.08 is +1.2 v. and the clear output 10.10 is +.2 v.

The logical function of the flip-flop may be explained by assuming that the two inputs are A and B. The set output would be AB and the clear output would be $\overline{AB}$.

In the discussion hereinafter, the logic diagram symbols to be used are shown in FIGURE 17a. The symbols will serve to represent the basic electronic circuits described hereinbefore.

The basic transistor amplifier circuit of FIGURE 12 may be shown either as the arrow-square combination of FIGURE 17b or the arrow-circle combination of FIGURE 17c. In both cases, an A applied to the input results in an $\bar{A}$ output. Electrically, the circle and square represent a collector load resistance.

The AND gate of FIGURE 13 is illustrated by FIGURE 17d. The output of the square is $\overline{\bar{A}+\bar{B}}$ or $\overline{(\overline{AB})}$ which equals AB.

The OR gate of FIGURE 14 is illustrated by FIGURE 17e. The output of the square is $\overline{\bar{A}+\bar{B}}$ which equals $A+B$.

The flip-flop of FIGURE 15 is illustrated by FIGURE 17f. The set output is equivalent to AB or $\overline{\text{clear}}$. The clear output is $\overline{AB}$ or clear.

Typical methods for interconnecting the above described transistor circuits may be found in two co-pending applications, the first being entitled a "Twisted Pair Transmission System," Ser. No. 381,041, by Lester T. Davis and the second being entitled a "Coaxial Cable Transmission System," Ser. No. 381,040, by Lester T. Davis, each filed on July 8, 1964.

Now that the basic transistor amplifier, AND gate, OR gate, and flip-flop have been discussed including their associated logical symbols, the remaining discussion will disclose typical sequences for the set F, set Q, and set X–B–A designators using the above logical symbols.

FIGURE 18 is a logical diagram illustrating a typical set F designator sequence of the scoreboard. Generally, the instruction is placed in the $U^1$ register from the instruction stack (not shown). The *fm* portion of the instruction is passed to the translate unit, to the AND gate which is conditioned by the issue unit and to the $U^4$ register. The output from the $U^4$ is ANDed with the $\overline{\text{busy}}$ and the issue. This will set the unit busy flip-flop if the unit is not busy. The $U^1$ register also will AND the *f m i j k* instruction with the issue, passing the instruction to the $U^2$ register. From the $U^2$ register, the *i, j* and *k* portions of the instruction will be ANDed with the output of the unit busy flip-flop to set the $F_i$, $F_j$ and $F_k$ designators respectively.

FIGURE 19 illustrates in detail the set F designator sequence in logical block form using the logical symbols of the basic circuits. The embodiment of FIGURE 18 is shown for an add instruction. For example, the translate unit illustrates the proper combination for an add instruction when the $fm$ portion is 30XXX to 35XXX. Also, in the $U^2$ register only the $j$ part of the instruction is illustrated. The $j$ part of the instruction is passed through the plurality of AND circuits and OR circuits until the appropriate F designators of the ADD unit are selected and set. The entire operation of the Set F is under control of the issue unit as shown.

Figure 20:
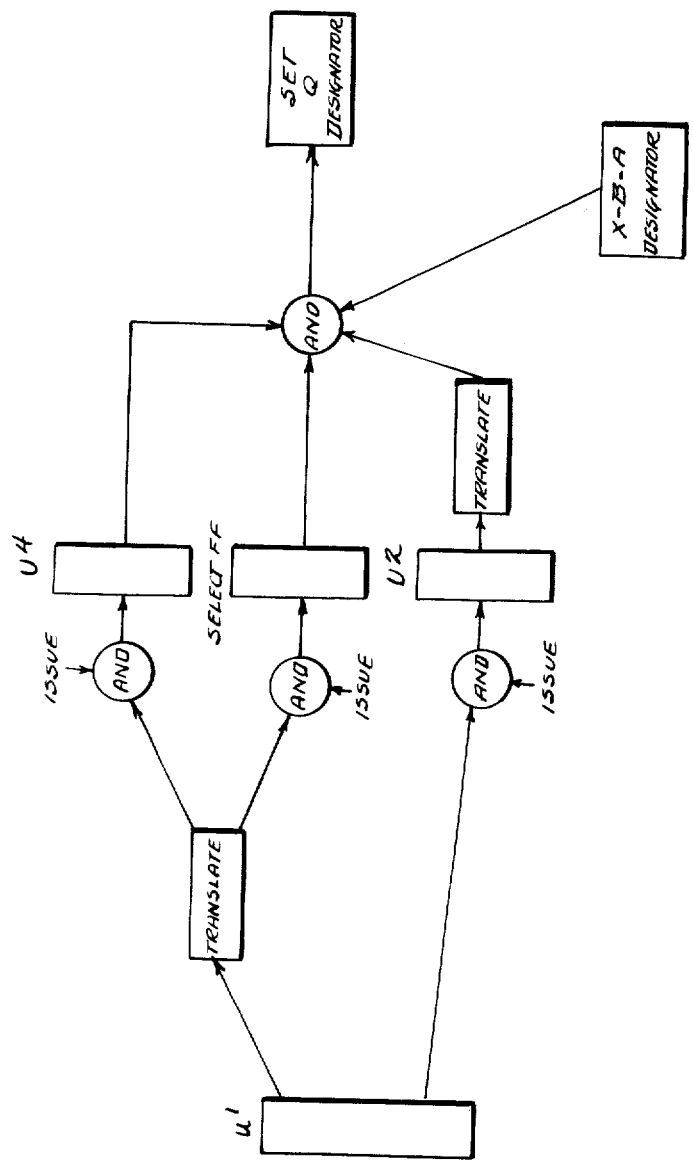
FIGURE 20 is a logic diagram illustrating a typical Set Q designator sequence of the scoreboard.

FIGURE 20 is a logical diagram illustrating a typical set Q designator sequence of the scoreboard. Note that the contents of the X–B–A designator is passed via an AND gate directly into the and setting the Q designator.

Figure 21:
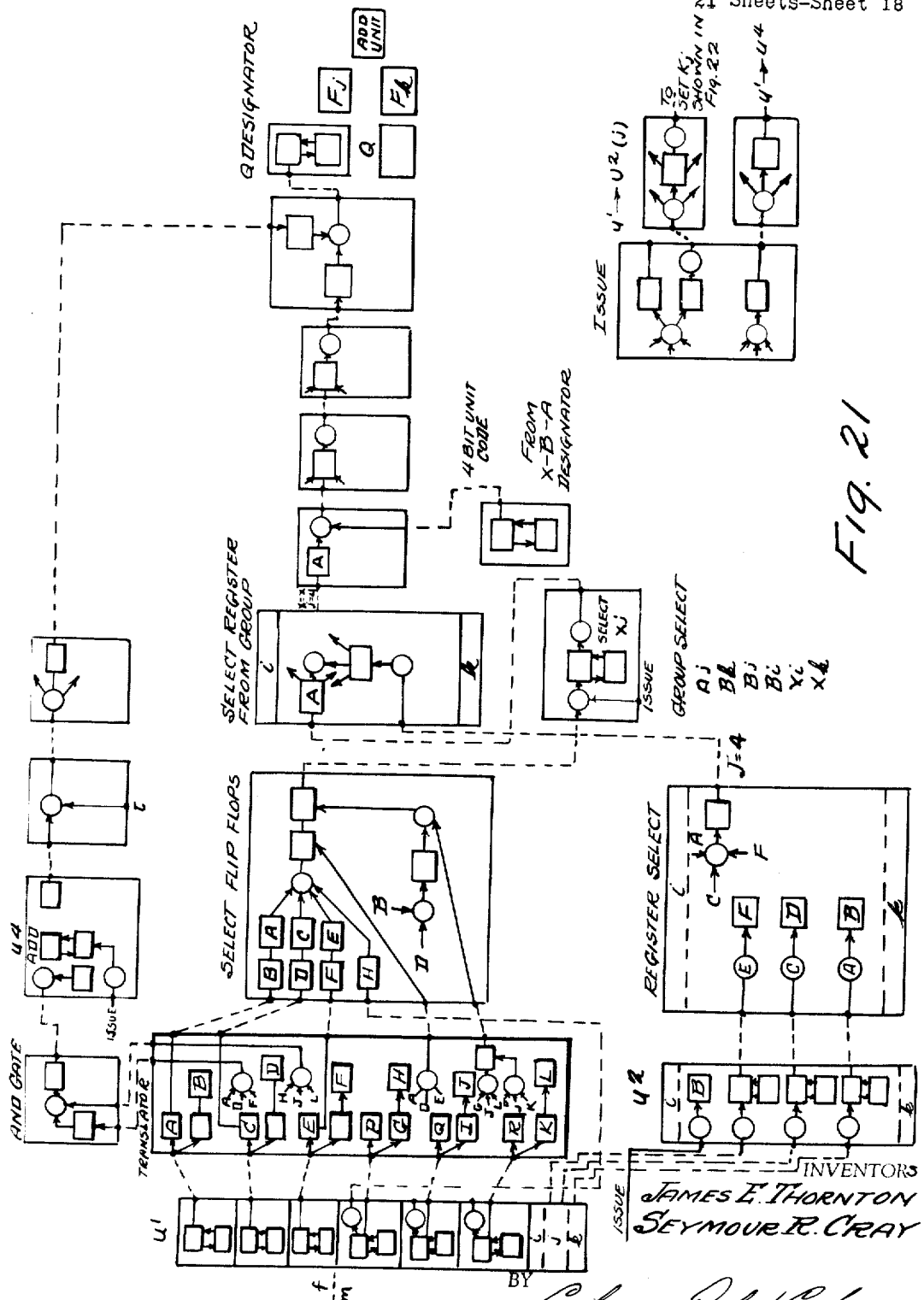
FIGURE 21 illustrates in detail the Set Q designator sequence operation in logical block form.

FIGURE 21 illustrates in detail the Set Q designator sequence operation in logical block form. The embodiment shown is again for an instruction wherein the $fm$ code is 30XXX to 35XXX. As illustrated, the select flip-flop will select the appropriate group operational register, for example, X, and the register select will select the $j$ register, for example $j=4$, which will be ANDed by the select register from group, for example, $X_j=X_4$. Thereafter, the selected register designator will have its contents (a four bit unit code) passed and stored by the Q designator of the appropriate unit, for example, the add functional unit. Note that the issue will control various housekeeping operations, for example, $U^1$ register contents to $U^2$, $U^1$ register to $U^4$ register and to the set $X_j$ designator.

Figure 22:
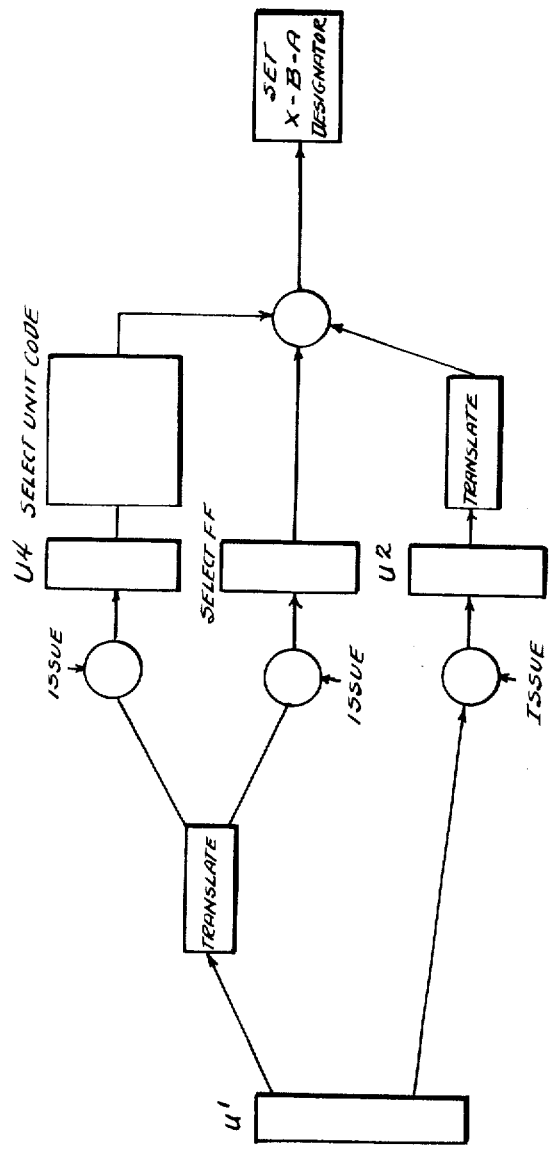
FIGURE 22 is a logic diagram illustrating a typical Set X–B–A operational register designator sequence of the scoreboard.

FIGURE 22 is a logical diagram illustrating a typical set X–B–A operational register designator sequence of the scoreboard. Note that the $U^4$ register passes its contents to the select unit code which selects the appropriate unit code to be stored in the X–B–A designators.

Figure 23:
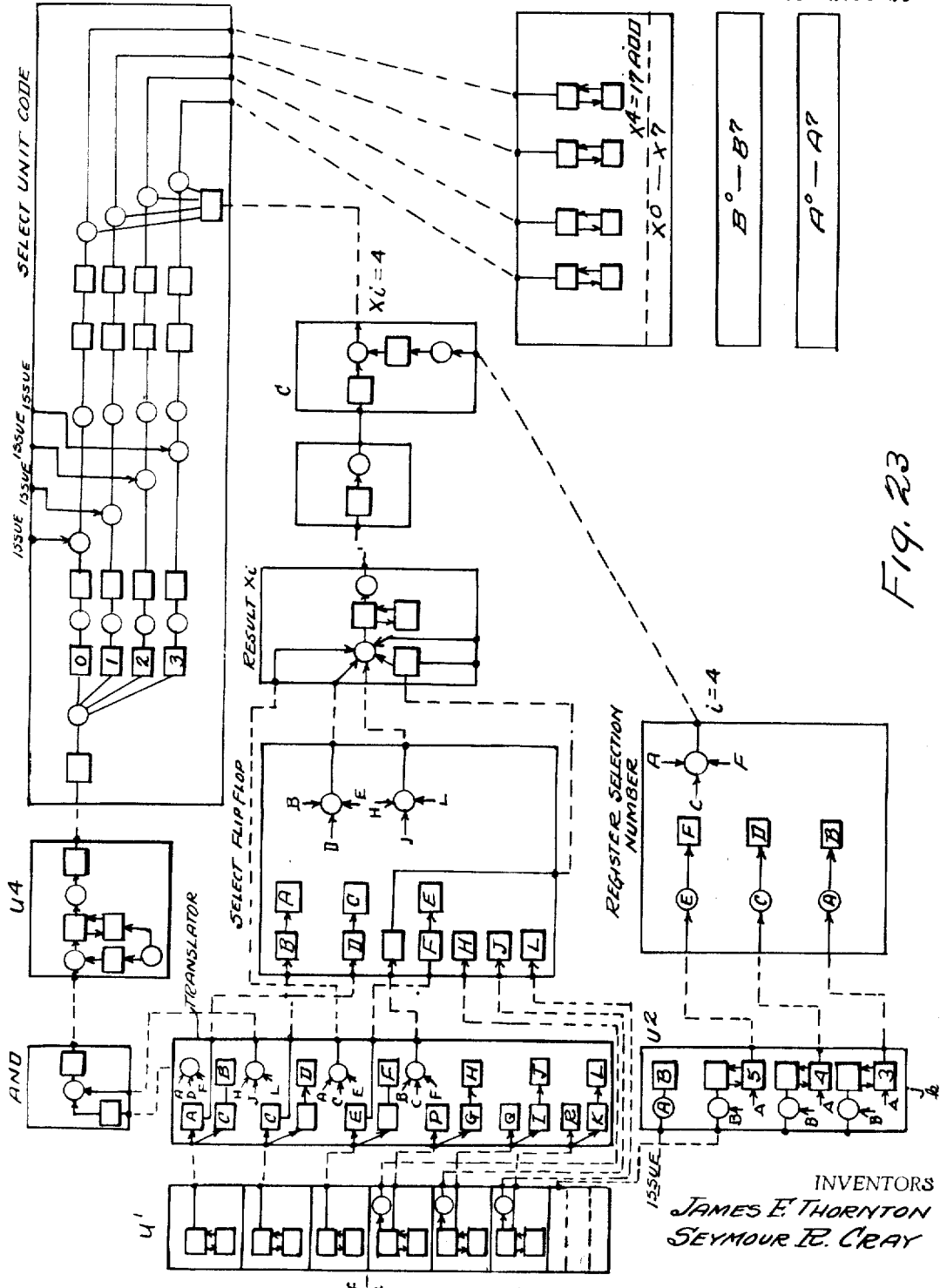
FIGURE 23 illustrates in detail the Set X–B–A operational register designators in logical block form.

FIGURE 23 illustrates in detail the set X–B–A operational register designators in logical block form. The embodiment shown is for an add unit and for the $j$ portion of the add instruction. The $X_4$ operational register is shown having its $X_4$ designator set to the add unit code 1111 (octal 17).

Figure 24:
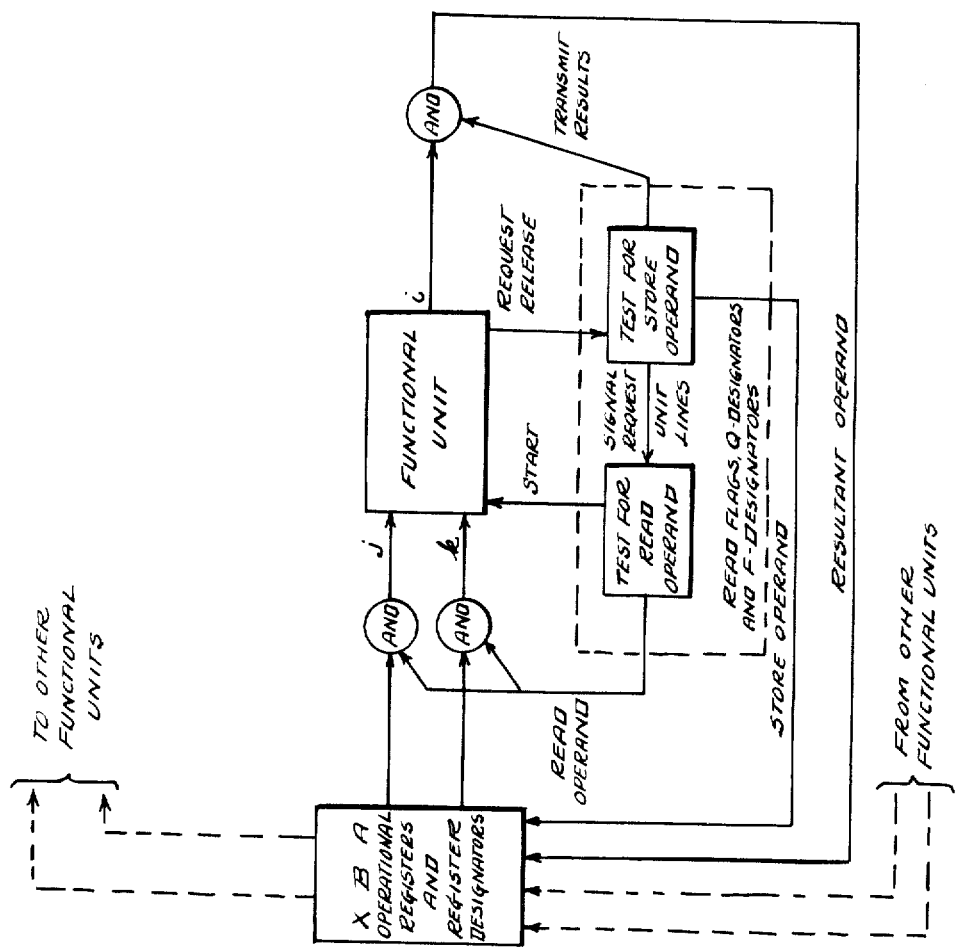
FIGURE 24 is a block diagram illustrating operation control for executing the placed reservations.

FIGURE 24 is a block diagram illustrating operation control for executing the placed reservation. As discussed hereinbefore, the operation control of the functional unit is dependent upon the test for store operand and the test for read operand, which tests are based upon ANDing of the read flags, the Q designators and the F designators. The operational registers communicate with each functional unit in a similar manner as the functional unit shown.

It will be understood that any appropriate functional units, registers and electronic circuits may be utilized with the inventive digital data transmission system.

The above illustrative embodiment comprises a preferred embodiment of the invention. However, this embodiment is not intended to limit the possibilities of insuring the features of the digital data central processor. The digital data central processor disclosed herein is an example of an arrangement in which the inventive features of this disclosure may be utilized and it will become apparent to one skilled in the art that certain modifications may be made within the spirit of the invention defined by the appended claims.

What is claimed is:

1. A data processing system having a storage section, an input-output section, a control section, and a function section, the invention being characterized by:
   (a) the function section comprising:
      (1) a plurality of registers (1.60) connected to the storage section and capable of holding numerical data received from the storage section and transmitting data to the storage section;
      (2) a plurality of functional units (2.12) connected to the registers, each unit being capable of performing arithmetic and logical operations on data received from the registers and transmitting results to the registers;
   (b) the control section comprising:
      (1) a single instruction source (1.76) connected to the storage section and capable of receiving a plurality of instruction commands sequentially from the storage section;
      (2) a scoreboard logic network (1.66) connected to the instruction source, the functional units, and the registers, and responsive to signals from the instruction source to reserve selected functional units and selected registers for numerical data and results, the scoreboard logic network providing control signals to allow concurrent operation of a plurality of functional units in cooperation with the selected registers.

2. A data processing system according to claim 1, characterized in that the registers (1.60) comprise:
   (a) a plurality of multiple flip-flop, parallel-connected storage elements (1.82, 1.84) connected between the storage section and the functional units, responsive to signals received from the storage section and being capable of subsequently transferring these signals to the functional units, and responsive to signals received from the functional units and being capable of subsequently transferring these signals to the storage section;
   (b) a plurality of multiple flip-flop, parallel-connected storage elements (1.86) connected to the functional units, responsive to signals received from the functional units and being capable of transferring signals to the functional units.

3. A data processing system according to claim 1, characterized in that each functional unit comprises:
   (a) a plurality of F designator registers (5.08, 5.10, 5.12) responsive to signals received from the instruction source to store the identification numbers of the specified operand registers and the identification number of the specified resultant register;
   (b) a plurality of Q designator registers (5.14, 5.16) responsive to signals received from other functional units to store the identification number of any other functional unit when that other functional unit has reserved an operand register which has been identified in an F designator register;
   (c) a plurality of Q designator read flags (5.18, 5.20) responsive to signals received from the Q designator registers and to signals received from functional units, to provide an output signal when the functional units designated by the identification numbers stored in the Q designator registers have completed their logical operation.

4. A data processing system according to claim 1, characterized in that the instruction source comprises:
   (a) a plurality of instruction registers (1.76), the first instruction register being connected to the storage section and responsive to signals received therefrom, and the remaining instruction registers being connected in an ordered sequence, each instruction register being responsive to signals received from the adjacent lower order instruction register;
   (b) a plurality of output lines (1.80) connected between the highest order instruction register (2.02) and the scoreboard (1.66) for transferring instruction command signals to the scoreboard at a rate controlled by the scoreboard.

5. A data processing system according to claim 1, characterized in that the scoreboard logic network comprises:
   (a) an instruction control system (5.95) responsive to signals received from the instruction source to identify and select a functional unit and the specified input and resultant operational registers, and to generate an output signal if the selected functional unit is available and the specified resultant operational register is not reserved for the result of another functional unit;

(b) a reservation system (4.02) responsive to signals received from the instruction source, the operational registers, and the functional units to detect conflicting requests from the functional units for the use of specified operational input registers, and to reserve the specified operational input registers for the first requesting functional unit and to delay the operation of the second requesting functional unit until the specified operational input registers become available.

6. A data processing system according to claim 1, characterized in that the reservation system comprises:

(a) a test for issue unit (6.30) responsive to signals from the functional units and the instruction source to generate an output signal when the selected functional unit is available and the register specified to receive the resultant operand from the functional unit is also available;

(b) a unit control network (6.36) responsive to the output signal from the test for issue unit to transfer the specified register designation number from the issued instruction to the selected functional unit;

(c) a copy unit (6.40) responsive to the output signal from the test for issue unit to transfer a functional unit designation number to the Q designator registers.

7. A data processing system according to claim 1, characterized in that the scoreboard logic network comprises:

(a) circuits (5.98, 6.30) for receiving sequential instruction commands from the instruction source and for issuing instruction commands to the functional units; and (b) circuits (6.42) for starting the operation of functional units concurrently and in cooperation with issued instruction commands; and (c) circuits (6.60) for receiving resultants from the functional units in an order independent of the instruction issuing sequence; and (d) circuits (6.60) for organizing the order in which the resultants are subsequently processed to cooperate with the sequence of instruction commands.

References Cited

UNITED STATES PATENTS

| | | | |
|---|---|---|---|
| 3,200,380 | 8/1965 | MacDonald et al. | 340—172.5 |
| 3,226,692 | 12/1965 | Fuller et al. | 340—172.5 |
| 3,229,260 | 1/1966 | Falkoff | 340—172.5 |
| 3,242,467 | 3/1966 | Lamy | 340—172.5 |
| 3,247,488 | 4/1966 | Welsh et al. | 340—172.5 |
| 3,273,131 | 9/1966 | Strohm et al. | 340—172.5 |
| 3,274,554 | 9/1966 | Hopper et al. | 340—172.5 |
| 3,274,561 | 9/1966 | Hallman et al. | 340—172.5 |

ROBERT C. BAILEY, *Primary Examiner.*

J. VANDENBURG, *Assistant Examiner.*